US008543095B2

(12) United States Patent
Brown et al.

(10) Patent No.: US 8,543,095 B2
(45) Date of Patent: Sep. 24, 2013

(54) MULTIMEDIA SERVICES INCLUDE METHOD, SYSTEM AND APPARATUS OPERABLE IN A DIFFERENT DATA PROCESSING NETWORK, AND SYNC OTHER COMMONLY OWNED APPARATUS

(75) Inventors: Gregg H. Brown, Atlanta, GA (US); Robert Everett Hyatt, Alpharetta, GA (US); Marc Paul Lefar, Atlanta, GA (US); James Patrick Ryan, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 138 days.

(21) Appl. No.: 11/177,746

(22) Filed: Jul. 8, 2005

(65) Prior Publication Data
US 2007/0010195 A1 Jan. 11, 2007

(51) Int. Cl.
*H04M 3/42* (2006.01)

(52) U.S. Cl.
USPC ........ 455/414.1; 370/259; 370/260; 370/261; 370/262; 370/263; 379/157; 379/158

(58) Field of Classification Search
USPC ...................................................... 455/414.1
See application file for complete search history.

(56) References Cited

U.S. PATENT DOCUMENTS

| 6,151,491 A | | 11/2000 | Farris et al. |
|---|---|---|---|
| 6,167,253 A | * | 12/2000 | Farris et al. ................. 455/412.2 |
| 6,314,094 B1 | * | 11/2001 | Boys .............................. 370/352 |
| 6,381,314 B1 | * | 4/2002 | Walinski ................... 379/101.01 |
| 6,446,076 B1 | * | 9/2002 | Burkey et al. ............... 704/270.1 |
| 6,529,584 B1 | * | 3/2003 | Ravago et al. ................ 379/67.1 |
| 6,711,474 B1 | * | 3/2004 | Treyz et al. ........................ 701/1 |
| 6,779,042 B1 | * | 8/2004 | Kloba et al. ................... 709/248 |
| 6,847,823 B2 | | 1/2005 | Lehikoinen et al. |
| 6,868,403 B1 | * | 3/2005 | Wiser et al. ...................... 705/51 |
| 6,892,067 B1 | * | 5/2005 | Sharma et al. ................. 455/419 |
| 6,947,728 B2 | * | 9/2005 | Tagawa et al. ............. 455/414.1 |
| 6,965,770 B2 | * | 11/2005 | Walsh et al. ................ 455/426.1 |
| 7,000,032 B2 | * | 2/2006 | Kloba et al. ................... 709/248 |
| 7,027,995 B2 | | 4/2006 | Kaufman et al. |
| 7,089,202 B1 | * | 8/2006 | McNamar et al. .............. 705/35 |
| 7,107,045 B1 | * | 9/2006 | Knoop ........................ 455/414.1 |

(Continued)

FOREIGN PATENT DOCUMENTS

| GB | 2401209 A | | 11/2004 |
|---|---|---|---|
| WO | WO9959263 | * | 11/1999 |

OTHER PUBLICATIONS

OA dated Jul. 1, 2008, for U.S. Appl. No. 11/259,388, 12 pages.

(Continued)

*Primary Examiner* — Lester Kincaid
*Assistant Examiner* — Diego Herrera
(74) *Attorney, Agent, or Firm* — Turocy & Watson, LLP

(57) ABSTRACT

Architecture for accessing and purchasing multimedia services in a mobile terminal cellular environment. The architecture brings together the on-the-fly discovery of music and connectivity for the purchase or preview of multimedia services (e.g., music tracks). Provided is a music client on a cell phone or other mobile communications device that facilitates the discovery, storage, and play of multimedia content or portions thereof such as music. A user can listen to music transmitted to the mobile terminal device (e.g., cell phone) via broadcast, satellite radio, streaming internet radio, etc., review the music, and buy tracks or whole albums over-the-air via the mobile terminal.

51 Claims, 21 Drawing Sheets

(56) References Cited

U.S. PATENT DOCUMENTS

| | | | |
|---|---|---|---|
| 7,133,659 B2* | 11/2006 | Zalewski et al. | 455/403 |
| 7,239,871 B2 | 7/2007 | Shamp et al. | |
| 7,258,614 B1 | 8/2007 | Kates et al. | |
| 7,266,343 B1 | 9/2007 | Yli-juuti et al. | |
| 7,441,203 B2 | 10/2008 | Othmer et al. | |
| 7,490,775 B2* | 2/2009 | Biderman | 235/472.01 |
| 2002/0073205 A1* | 6/2002 | Mostafa | 709/227 |
| 2002/0128908 A1 | 9/2002 | Levin et al. | |
| 2002/0152267 A1* | 10/2002 | Lennon | 709/203 |
| 2002/0156691 A1* | 10/2002 | Hughes et al. | 705/26 |
| 2003/0003897 A1* | 1/2003 | Hyon | 455/413 |
| 2003/0014749 A1 | 1/2003 | Simons et al. | |
| 2003/0021441 A1* | 1/2003 | Levy et al. | 382/100 |
| 2003/0023424 A1 | 1/2003 | Weiner | |
| 2003/0050050 A1* | 3/2003 | Higuchi et al. | 455/414 |
| 2003/0055516 A1 | 3/2003 | Gang et al. | |
| 2003/0060157 A1 | 3/2003 | Henrick | |
| 2003/0073411 A1* | 4/2003 | Meade, II | 455/70 |
| 2003/0110211 A1* | 6/2003 | Danon | 709/203 |
| 2003/0135513 A1* | 7/2003 | Quinn et al. | 707/102 |
| 2003/0177073 A1* | 9/2003 | Ogai | 705/26 |
| 2004/0043790 A1* | 3/2004 | Ben-David et al. | 455/558 |
| 2004/0108381 A1 | 6/2004 | Elliot et al. | |
| 2004/0141476 A1* | 7/2004 | Chumbley et al. | 370/326 |
| 2004/0242207 A1 | 12/2004 | Chi | |
| 2005/0009466 A1* | 1/2005 | Kamdar et al. | 455/3.02 |
| 2005/0033855 A1* | 2/2005 | Moradi et al. | 709/231 |
| 2005/0038712 A1 | 2/2005 | Veeneman | |
| 2005/0045373 A1* | 3/2005 | Born | 174/254 |
| 2005/0215239 A1* | 9/2005 | Kopra et al. | 455/414.1 |
| 2005/0216855 A1 | 9/2005 | Kopra et al. | |
| 2005/0227674 A1* | 10/2005 | Kopra et al. | 455/414.1 |
| 2006/0008256 A1* | 1/2006 | Khedouri et al. | 386/124 |
| 2006/0025117 A1* | 2/2006 | Silverbrook et al. | 455/414.1 |
| 2006/0100925 A1 | 5/2006 | Finaly | |
| 2006/0116167 A1* | 6/2006 | Raviv et al. | 455/558 |
| 2007/0155402 A1 | 7/2007 | Van Erlach | |
| 2008/0207182 A1* | 8/2008 | Maharajh et al. | 455/414.1 |
| 2009/0054092 A1* | 2/2009 | Stonefield et al. | 455/466 |
| 2009/0163228 A1 | 6/2009 | Blumberg et al. | |

OTHER PUBLICATIONS

Final OA mailed Dec. 15, 2008 for U.S. Appl. No. 11/259,388, 17 pages.
OA mailed Mar. 19, 2009 for U.S. Appl. No. 11/259,388, 12 pages.
Office Action mailed Oct. 14, 2009 for U.S. Appl. No. 11/259,388, 18 pages.
Final OA mailed Jul. 9, 2010 for U.S. Appl. No. 11/259,388 20 pages.
Office Action mailed Oct. 6, 2010 for U.S. Appl. No. 11/259,388, 16 pages.
OA dated Aug. 22, 2011 for U.S. Appl. No. 11/259,388, 21 pages.
OA dated Feb. 2, 2012 for U.S. Appl. No. 11/259,388, 12 pages.
OA dated Mar. 28, 2011 for U.S. Appl. No. 11/259,388, 17 pages.
OA dated Sep. 19, 2012 for U.S. Appl. No. 13/548,681, 16 pages.
International Search Report dated Feb. 16, 2007 for PCT Application Serial No. US06/26339, 2 Pages.

* cited by examiner

US 8,543,095 B2

MULTIMEDIA SERVICES INCLUDE METHOD, SYSTEM AND APPARATUS OPERABLE IN A DIFFERENT DATA PROCESSING NETWORK, AND SYNC OTHER COMMONLY OWNED APPARATUS

TECHNICAL FIELD

This invention is related to multimedia services for mobile communications devices such as for downloading music to cellular device, for example.

BACKGROUND

Telecommunications is a rapidly evolving industry that has exploded into the market in recent years with all types of mobile communications devices and systems. The advent of the Internet and its vast EP (Internet Protocol) capabilities has opened the door for telecommunications to find ways of providing services that heretofore were not available to the cellular user. The use of mobile devices such as cellular telephones, Personal Digital Assistants (PDAs) and handheld computers is growing at rates that greatly exceed even the most optimistic predictions of only a few years ago. Cellular telephones have been widely accepted because they are inexpensive and allow individuals to move about freely yet stay in contact with friends and sources of entertainment. Other mobile devices like those that play and record music or moving pictures, for example, also have been widely accepted because they provide entertainment and allow individuals to have fin.

Mobile devices are used throughout the world by individuals of all ages but they are especially popular among individuals that embrace "pop culture" trends and lifestyles. The pop culture appeals to a large segment of the population, especially among youth, and is readily accepted throughout the world. Music and moving pictures that are recorded and distributed by professional sources is an important part of the pop culture. There is, however, a growing interest by individuals to download from music vendors or create their own aural or visual content and then share it with friends. Unfortunately, creation and distribution of aural and visual content like music and motion pictures has required the use of devices that are not portable or cannot be carried as easily as a cellular telephone.

The telecom industry is currently shifting towards all-IP systems, driven by the fundamental need to reduce costs, create new revenue generating services and to protect the operator business model, and IMS (IP Multimedia Subsystem) is a new core and service domain that enables the convergence of data, speech and network technology over an IP-based infrastructure. It is the operator choice of control and service logic for EP packet-based communication. For users, IMS-based services enable communications in a variety of modes that include voice, text, music, pictures and video, or any combination of thereof in a highly personalized and secure way. IMS is designed to fill the gap between the existing traditional telecommunications technology and Internet technology that increased bandwidth alone does not provide, and allows operators to offer new, innovative services that share holders and end users are expecting.

Music store websites provide music download capabilities which are accessible via the IMS capabilities. A subscriber can access a WAP (wireless application protocol) page on phone, and purchase music, and send music to a computer. Thus, favorites such as music and video can be streamed to the listener on a device or requested for download and then downloaded to the device. However, there does not exist a system with the capability to bring everything together where the subscriber can listen to music on the radio, identify it via a live connection with the mobile device, tag it for later purchase, and actually have that music on the connected mobile device.

SUMMARY

The following presents a simplified summary in order to provide a basic understanding of some aspects of the disclosed innovation. This; summary is not an extensive overview, and it is not intended to identify key/critical elements or to delineate the scope thereof. Its sole purpose is to present some concepts in a simplified form as a prelude to the more detailed description that is presented later.

The invention disclosed and claimed herein, in one aspect thereof, comprises architecture in the cellular services environment that brings together the on-the-fly discovery of music and connectivity for the purchase or preview of multimedia services or portions thereof (e.g., music tracks). Provided herein is a client on a cell phone or other mobile communications capable device, that facilitates the discovery, storage, and play of multimedia content or portions thereof (e.g., music). A user can listen to music transmitted to the mobile terminal device (e.g., cell phone) via broadcast radio, satellite radio, streaming internet radio, etc., review the music, and/or buy tracks or whole albums over-the-air via the mobile terminal. Disclosed herein as an aspect of the invention is a discovery component for discovering a music ID or other music metadata. In one example, the user employs the discovery component to receive, analyze and output information associated with a song that is playing on another device (e.g., a standard FM or AM radio device), the information including an ID, the song name, artist name, album name, etc. Thereafter, the user can buy the track, download it, and listen to it on the mobile terminal.

In another aspect, a peer-to-peer configuration is disclosed such that at least two terminals can communicate to exchange music and/or music metadata, video content, or other items such as ringtones, ringback, and wallpaper.

In yet another aspect of the invention, a first user can transmit a purchased track and/to preview track to a second cellular user via an attachment to a message (e.g., SMS-short message service or MMS-multimedia messaging service).

In still another aspect thereof, a first user can play a track on a first phone and transmit the playing track to a second phone of a second user so that the second user can listen to the track.

In another aspect, the user tags a track that is being listened to or thereafter, and downloads the track to the cell phone. The downloaded track can be a preview (or shortened) version that is wrapped in a coded file (e.g., DRM-digital rights management), which only allows a short play version of the track. If purchased from the vendor, a key is sent from the vendor to the user that unlocks the short version for complete access to the full version of the track.

In yet another aspect thereof, a machine learning and reasoning component is provided that employs a probabilistic and/or statistical-based analysis to prognose or infer an action that a user desires to be automatically performed.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
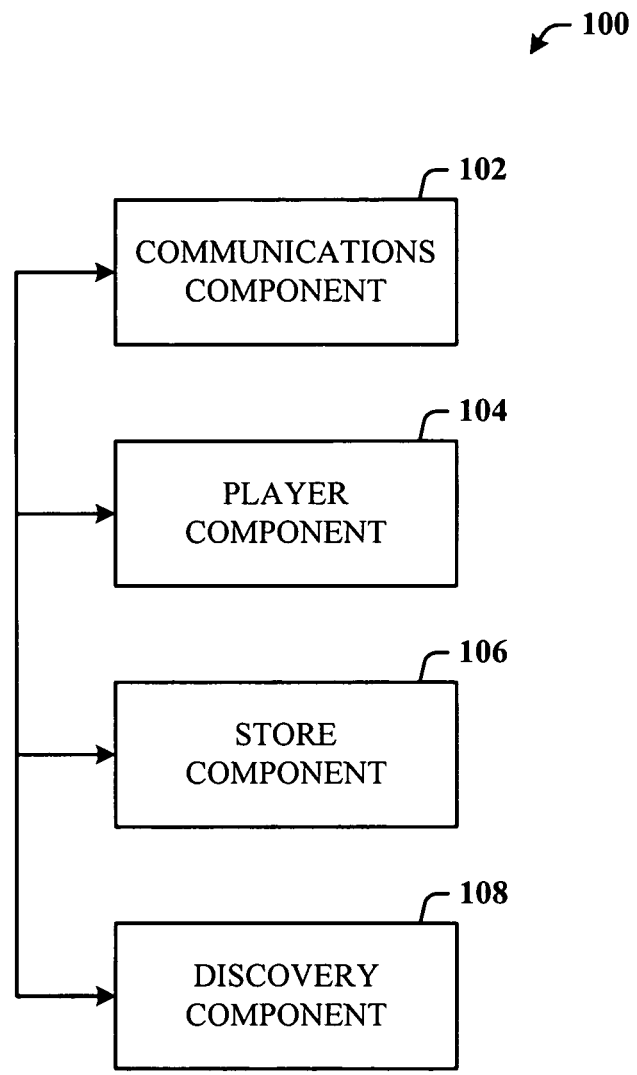
FIG. 1 illustrates a system that facilitates cellular multimedia services in accordance with the subject invention.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates cellular multimedia services in accordance with the subject invention. The system 100 can include a communications component 102 that facilitates communications between a mobile terminal (e.g., a cell phone) and a cellular network. The communications component 102 can also provide communications capability in a peer-to-peer mode, for example, between two cell phones, a cell phone and a computing device (e.g., a desktop computer, a portable computer, a personal digital assistant (PDA)), and other networks, systems and computing devices. Thus, the communications component 102 can include a wide variety of communications technology, including but not limited to cellular communications technology (e.g., for 2 G, 2.5 G, 3 G, 4 G cellular networks, etc.), unlicensed network technology (e.g., WiFi, Bluetooth, WiMax, etc.), serial communications technology (e.g., universal serial bus (USB), IEEE 1394), infrared, and so on.

The system 100 can also include a player component 104 that facilitates playing or presentation of the content (e.g., speech, audio, graphics, video, and multimedia content), a store component 106 that facilitates storing of the content, and a discovery component 108 that facilitates discovering the content. Note that although this description will now focus on music as one aspect of the multimedia content, it is to be understood that the subject innovative architecture applies to all components of multimedia content such as voice, images, text, audio, and video content, for example, and in any combination (e.g., text and voice, images and music, etc.). Here, a cell phone includes the communications capability via the communications component 102 to receive music content from a music channel (e.g., broadcast radio network, satellite radio network, Internet radio service and/or websites, . . . ). The player component 104 allows the cell phone to play the music transmitted over the radio channel. Thus, the user of the cell phone can listen to the music as it is being received and played. The player component 104 in combination with the communications component 102 can facilitate broadcasting the received content to other devices.

The store component 106 allows the user to choose to store the track being received and played. Such storage capability can include flash memory technology already included within the cell phone, an attachment to the phone that can be removed or reused, and/or as a removable memory that can be as desired inserted, and once loaded, removed and used elsewhere with the recorded music stored thereon.

In one aspect, the discovery component 108 facilitates receiving and processing metadata associated with the music track all or part of which can be presented to the user via a display, and/or audibly, if desired. The metadata can include, for example, artist name, album name, track title, duration of track, and so on. Such metadata can be readily received with the music from digital satellite radio systems. The metadata can also include data that facilitates linking or routing user access via the cell phone to a website or other network location that hosts further information about the artist such as other albums, concert events, biographical information, ringtone tunes, ringback tunes, wallpaper for the phone display, album art, images and/or short video clips for download and use on the cell phone, short music clips, etc. This is only a small list of information that can be provided to the user once the site is accessed.

A user can also browse tracks and other related products using a WAP (wireless application protocol) browsing capability that includes a robust music-centric mobile browsing site, for example, which enables users to access and use content.

The discovery component 108 also can include technology that facilitates receiving music signals from another music source (e.g., radio, flash memory module, tape player, television, CD, DVD, streaming video, . . . ) and, processing and analyzing the signals to resolve the music track title, author, album, etc. In operation, the user holds his or her cell phone (or other capable device) near the music source. Music signals are output from a speaker and picked up by a microphone for input, processing and analysis. The discovery component 108 facilitates the recording and/or processing of the received musical sounds into a format that can be compared with a database of music, and from which the playing music can be associated with an artist, title, "record" company, etc. Thus, an attribute of the music can be employed as a search term for querying a suitable database for associated content. This attribute information can also be used to purchase the associated music track, and/or album, and other related items (e.g., ringtones, ringbacks, wallpaper, services, . . . ). The discovery component 108 also supports JAVA music recognition (and video applications) support, and non-music recognition technologies for news and weather, for example.

In one implementation, when the user tags music content for review, the tagged content can be sent to the subscriber's voice inbox, wherein calling the voice inbox automatically plays the music version (e.g., preview, full length) provided for perception by the subscriber. The user can then delete the version in the inbox, or save, or even hit a special keystroke that initiates auto-purchase of the music track.

It is within contemplation of the subject invention that discovery can also occur via a tethered communications connection between the cell phone and the music source. For example, the music channel can be transmitted to the cell phone over a serial cable connection (e.g., USB-universal serial bus, IEEE 1394, etc.) such that the received music signals are then analyzed and processed into a format suitable for querying against a database for matching information for artist name, titles, etc.

Figure 2:
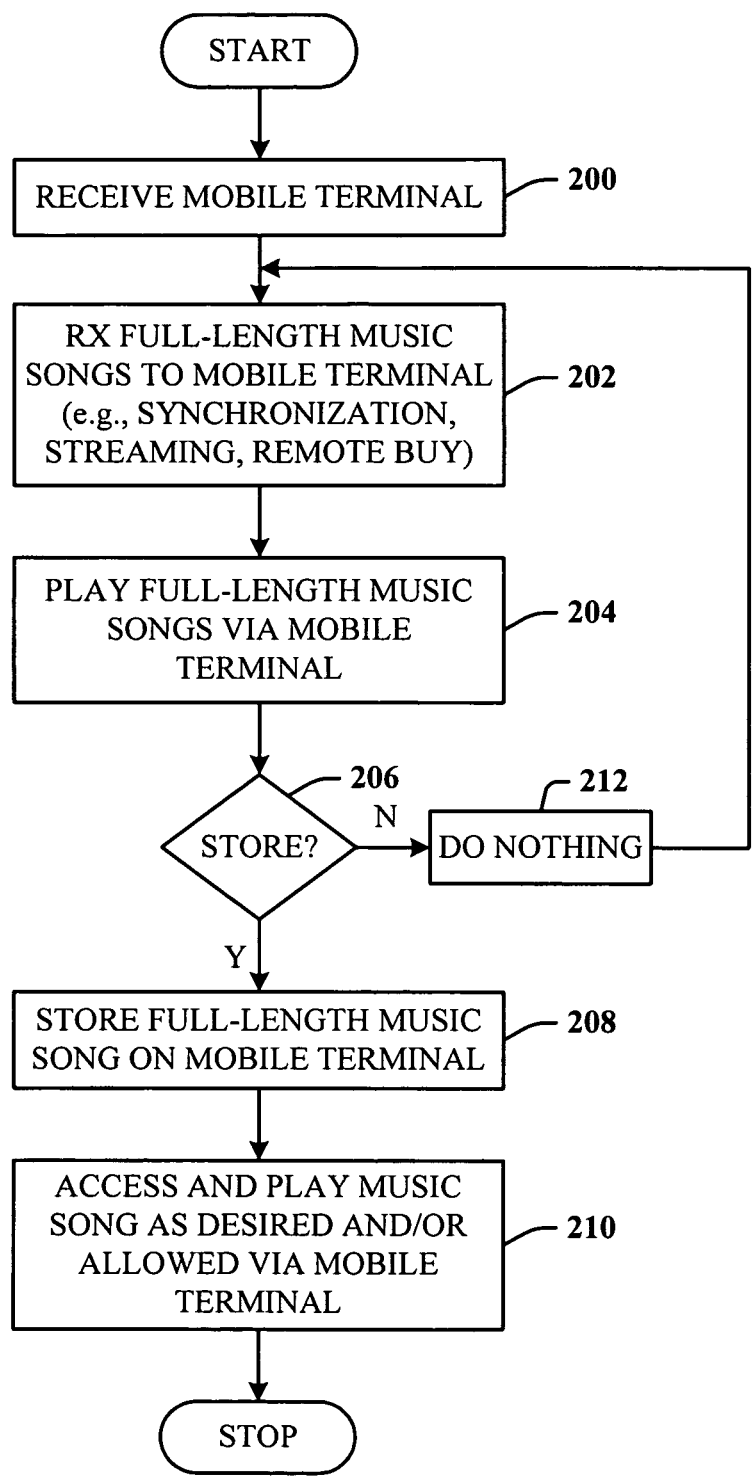
FIG. 2 illustrates a methodology of providing multimedia services (e.g., music) in a cellular network environment.

FIG. 2 illustrates a methodology of providing multimedia services (e.g., music) in a cellular network environment. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a mobile terminal (e.g., a cell phone) is received for wireless communications. At 202, the mobile terminal includes radio network communications capability such that at least broadcast voice and music signals can be received and presented thereby to a user. As indicated supra, the mobile terminal can receive not only broadcast music channels, but also digital satellite channels, and streaming network-based transmission (e.g., via the Internet). At 204, the mobile terminal can play full-length music tracks for the user. At 206, if the user likes the music, he or she can determine whether to record and or download the music track on the mobile terminal. If yes, at 208, the full-length version of the track can be stored in the terminal. At 210, the user can then access and play the stored track using the mobile terminal. At 206, if the user chooses not to store the current music track, flow is to 212 to do nothing, and flow continues back to 202 to process the next track received.

In order to record and store the music, the user can employ any number of triggers or operations that are disclosed in greater detail infra. As describer previously, where provided, music metadata can be processed such that if the user presses a button on the terminal, a signal is communicated from the terminal back to a network node that tags the current playing selection, or activates a timestamp with station information such that the track can be determined from the station and temporal information of the timestamp event. Thereafter, the tagged selection can be downloaded to the terminal for storage, or to another user device, for example, a home computer. It is within contemplation of the subject invention that the tagged music track can be made available for subsequent download by the user for a period of time (e.g., hours, days) after tagging. Once the period of time has expired, the track is no longer available for user access.

Figure 3:
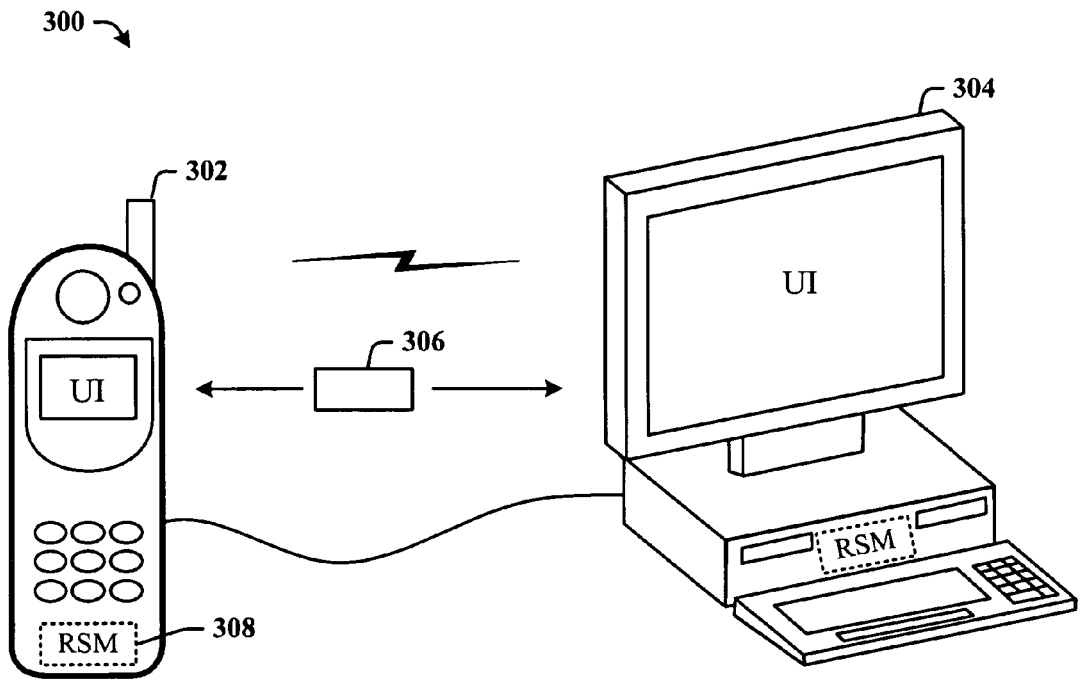
FIG. 3 illustrates a system whereby a mobile terminal can synchronize music tracks with another device.

Referring now to FIG. 3, there is illustrated a system 300 whereby a mobile terminal 302 (e.g., cell phone) can synchronize music tracks with another device 304 (e.g. a home computer). In this application, tracks can be transferred from computer 304 to the mobile terminal 302 via one or more synchronization methods, such as by way of example only, removable non-volatile memory cards 306 (e.g., a USB pen drive), wireless communications (e.g., Bluetooth) and wired tether (e.g., USB, IEEE 1394). Similarly, tracks can be transferred from the terminal 302 to the computer 304. There also can be some form of remote synchronization management (RSM) subsystem 308 that can take the form of a client on the terminal 302 and/or the computer 304 that facilitates the automatic synchronization without the user swapping memory cards, etc. The RSM 308 can provide a user interface that allows user selection of tracks, and other items (e.g., ringtones, ringbacks, wallpaper, links, . . . ) downloaded to the terminal 302, for example, and/or to the computer 304. The RSM user interface (UI) can be provided on either or both of the terminal 302 or/and the computer 304 such that the user can be presented with related information for selection.

Note that it is not necessary that the RSM 308 reside in both entities. The RSM 308 can be sufficiently robust in the mechanical and software interface to access hardware/software subsystems of the entities. For example, the terminal 302 need not host the RSM 308, while the desktop computer 304 can, such that the user can access tracks on the terminal 302 via the computer-hosted RSM 308.

Figure 4:
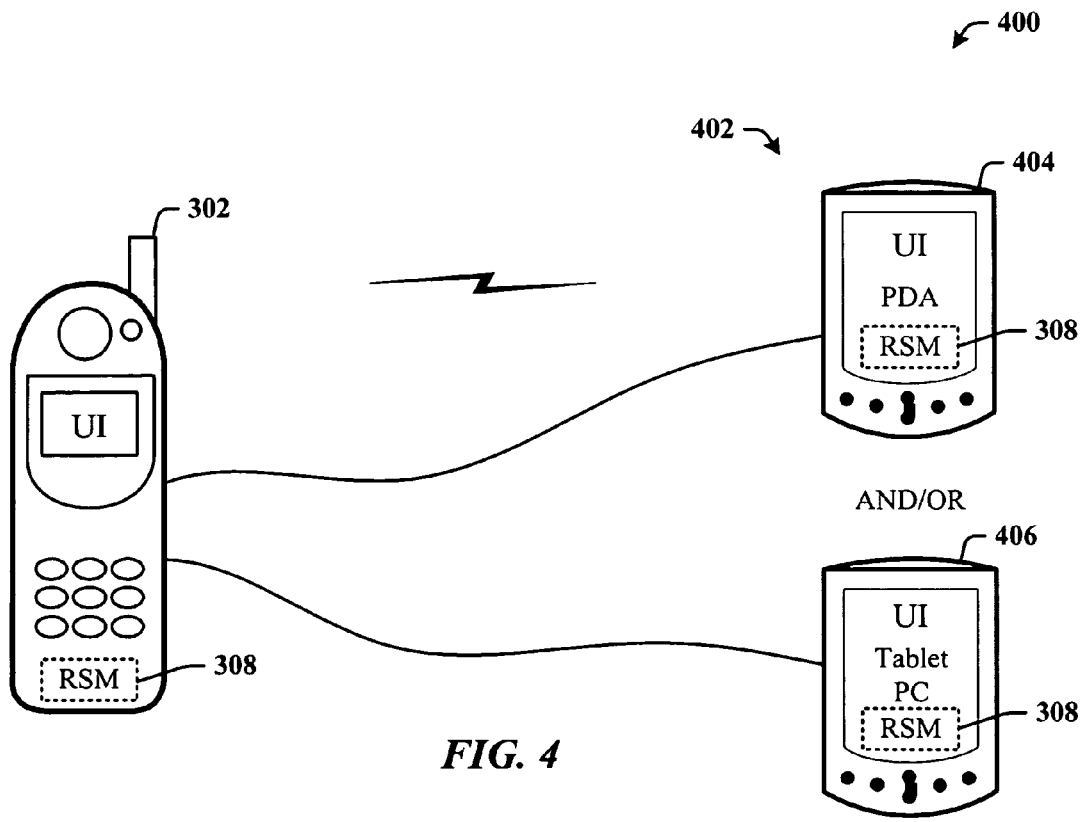
FIG. 4 illustrates a system whereby the mobile terminal can synchronize music tracks with other portable devices.

FIG. 4 illustrates a system 400 whereby the mobile terminal 302 can synchronize music tracks with other portable devices 402. The portable devices can include many different types of portable devices that support computing and application execution (e.g., a PDA 404, portable computer, tablet computer 406, portable music players, portable video players, . . . ). Here, the terminal 302 can execute the RSM 308 to cause synchronization with the PDA 404. This can occur wirelessly and/or via a wire tether. Similarly, the terminal 302 can synchronize with the table PC, again, wirelessly and/or via a wire tether. In a more robust implementation, the terminal 302 can synchronize with both the PDA 404 and the table PC 406 substantially simultaneously, in either or both the wireless or/and wired modes. Additionally, the devices 402 can host the RSM 308 to facilitate other features. For example, since it would be more efficient or useful for the user to employ the RSM UI on a device with a larger display, the RSM can facilitate utilization of the device with the larger display. Thus, as an example, where synchronization is between the terminal and the PDA 404, the RSM 308 will automatically employ the display of the PDA 404, when it includes greater display area than the terminal 302.

Figure 5:
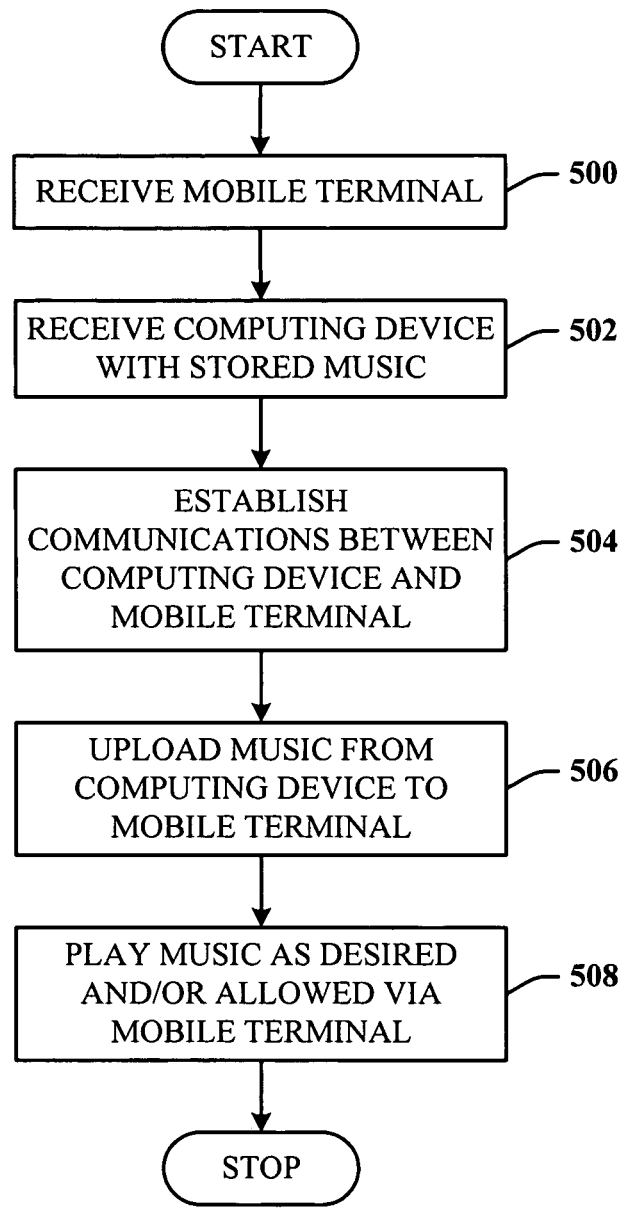
FIG. 5 illustrates a methodology of synchronizing the terminal with a computing device.

FIG. 5 illustrates a methodology of synchronizing the terminal with a computing device. At 500, the terminal is received for use. At 502, a computing device (e.g., a desktop computer) is provided for synchronization with the terminal. At 504, communications are established between the computing device and the terminal (e.g., wirelessly and/or tethered). At 506, music is uploaded from the computing device to the terminal. At 508, the user can play the uploaded music via the mobile terminal.

Figure 6:
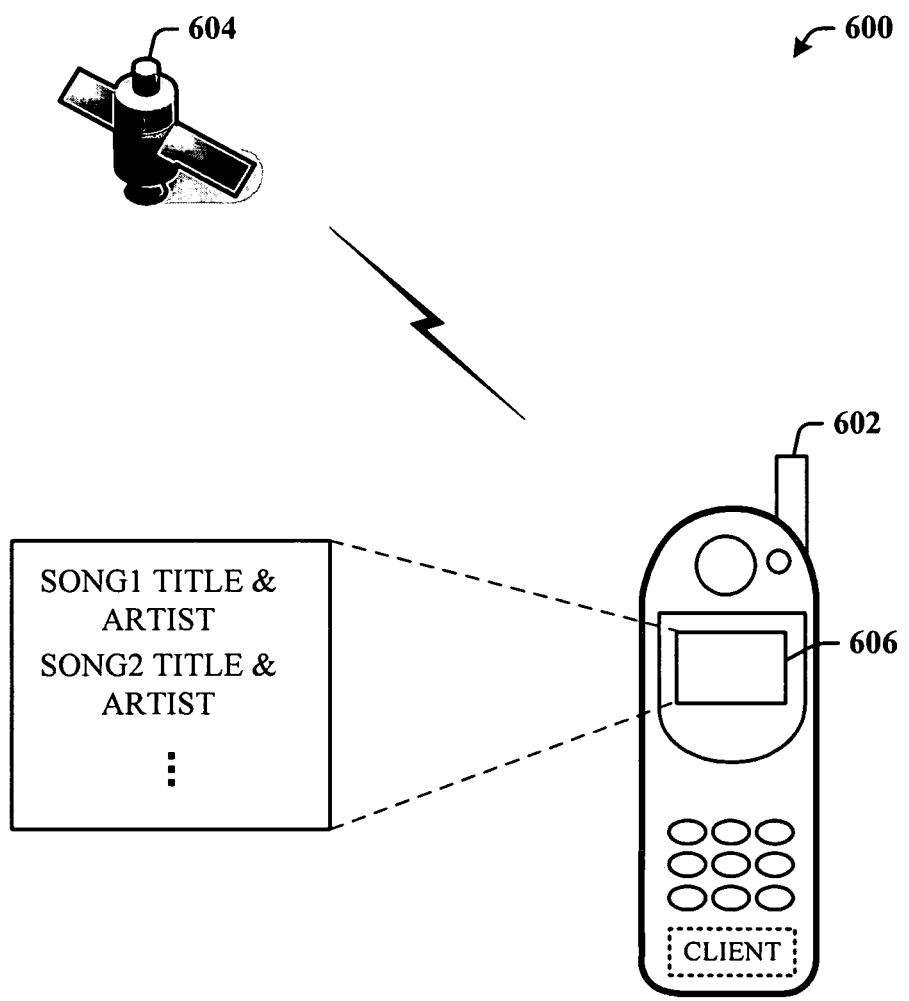
FIG. 6 illustrates a system whereby a terminal receives radio signals from a satellite radio system.

Referring now to FIG. 6, there is illustrated a system 600 whereby a terminal 602 receives radio signals from a satellite radio system 604. Here, the terminal 602 includes software to process the music signals and further process music metadata received therefrom and display some or all of the metadata via a display 606 of the terminal 602. The metadata displayed can include the music track, the title thereof, and the artist, for at least five tracks. This is dependent on the size of the display 606 of the terminal 602, and the amount of information to be displayed. Additional information or different information can be displayed to the user. This can be by selection or as a default set of metadata from the satellite radio system 604.

Figure 7:
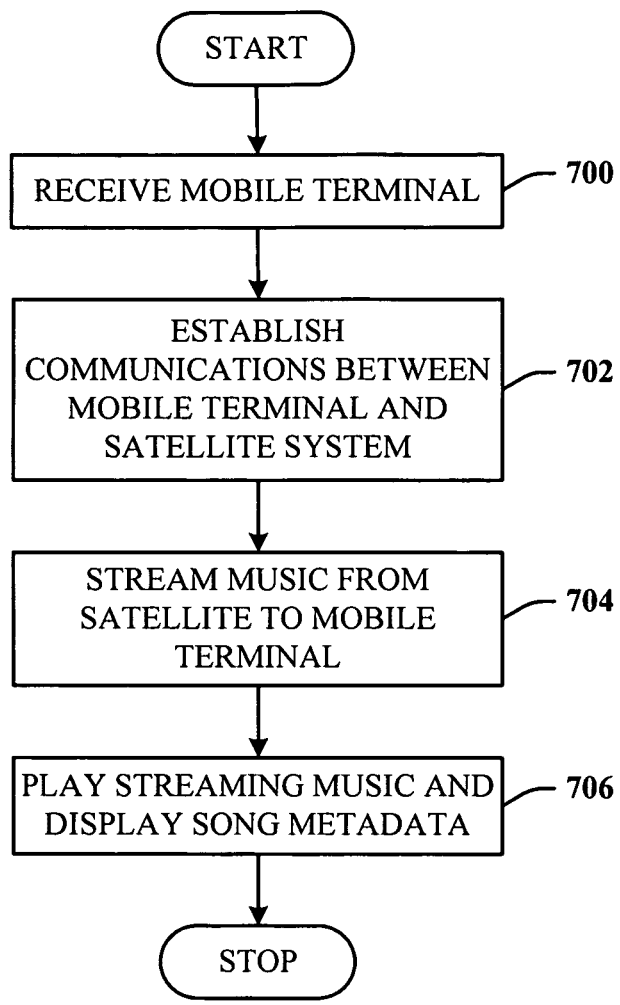
FIG. 7 illustrates a methodology of receiving and processing streaming radio signals from a satellite radio system.

FIG. 7 illustrates a methodology of receiving and processing streaming radio signals from a satellite radio system. At 700, a mobile terminal is received for use. At 702, communications is established between the terminal and the satellite system. At 704, music is streamed from the satellite system to the mobile terminal. At 706, the terminal plays the streaming music and displays metadata associated therewith and/or associated with the next music track to be played.

Figure 8:
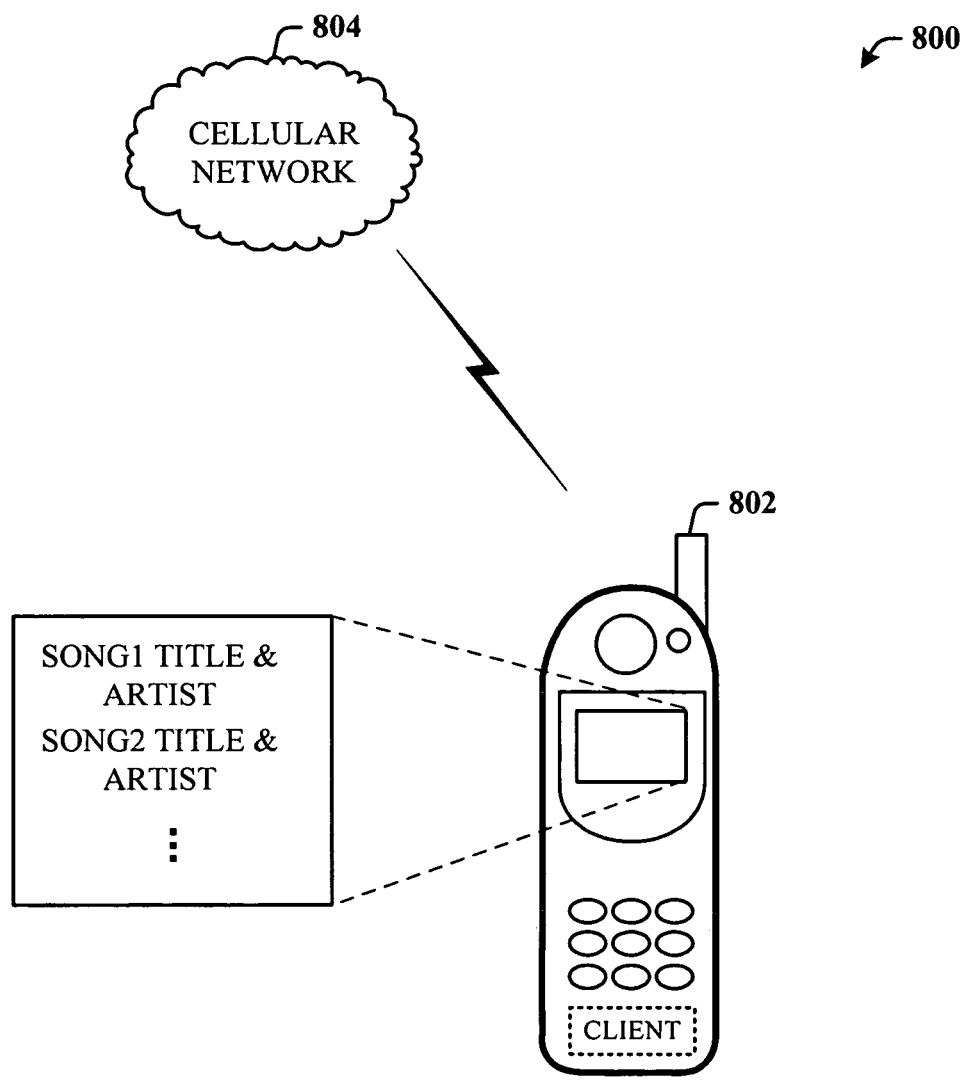
FIG. 8 illustrates a system whereby a terminal receives radio signals from a cellular radio system.

FIG. 8 illustrates a system 800 whereby a terminal 802 receives radio signals from a cellular radio system 804. The cellular system 804 can be employed to deliver analog and/or digital radio signals to the terminal 802 of presentation to terminal user. Here, the terminal can receive and process at least five music tracks, the metadata of which can be displayed via the terminal 802. The metadata can include the artist name, title of the track, album title, and so on.

Figure 9:
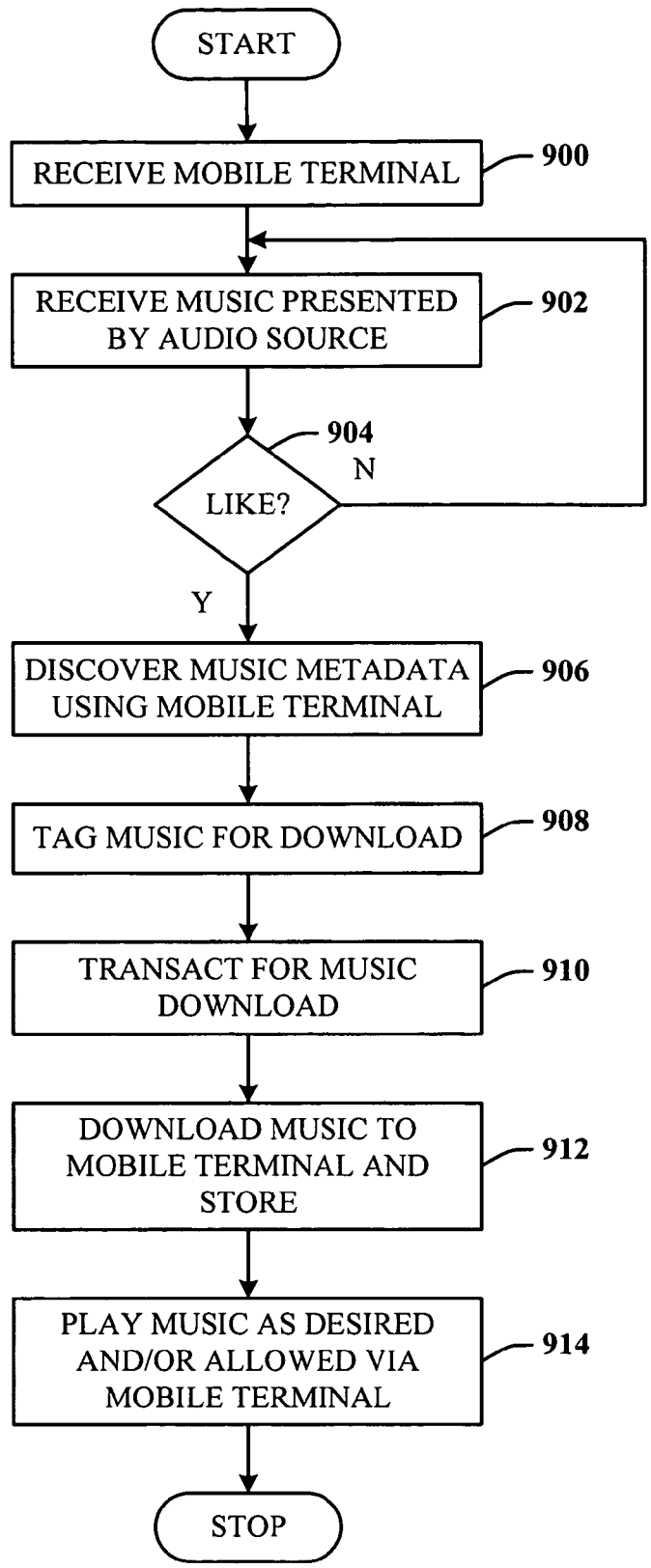
FIG. 9 illustrates a methodology of discovering music metadata via an audio source and uncoding purchased music.

FIG. 9 illustrates a methodology of discovering music metadata via an audio source and uncoding purchased music. At 900, the mobile terminal is received for use. At 902, the music is received by an audio source (e.g., a radio). At 904, the user determines if he or she likes the current playing selection. If so, flow is to 906, where the discovery component of the terminal discovers the metadata associated with the track. At 908, the user tags the music track for purchase and/or download. At 910, the user transacts for purchase of the track. At 912, the music is downloaded to the terminal and stored. At 914, the music can be played. If the music is wrapped in a code, it may be that only a certain portion of the track can be played, rather than the whole version of the track, until the code is unwrapped by the vendors via a code sent to the user which unwraps the remainder of the track for play and presentation. If the user does not like the track, flow is from 904 back to 902 to receive and process the next track.

Figure 10:
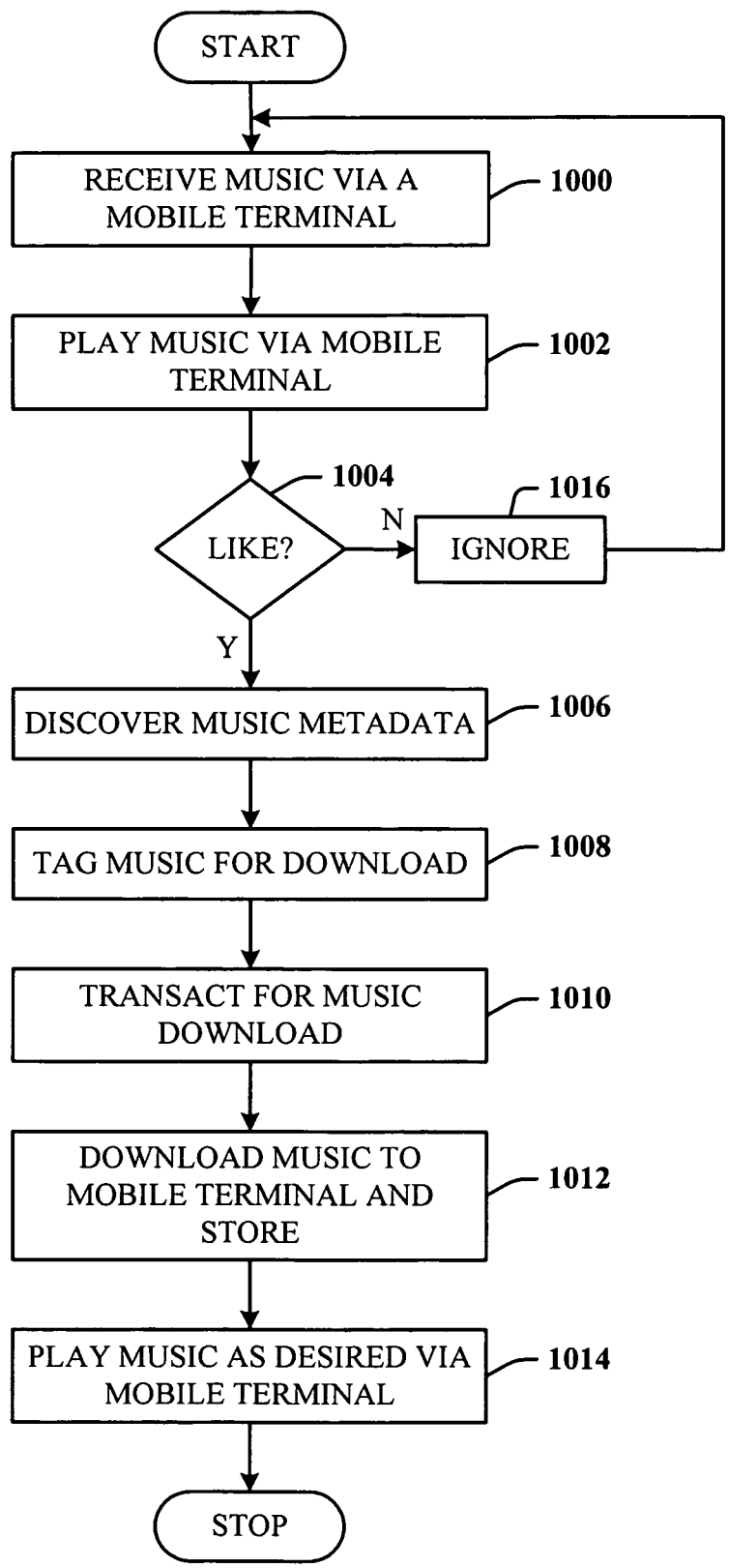
FIG. 10 illustrates a methodology of discovering music metadata and purchasing the music.

FIG. 10 illustrates a methodology of discovering music metadata and purchasing the music. At 1000, the mobile terminal is received for use. At 1002, the music is received by a radio channel and played. At 1004, the user determines if he or she likes the current playing selection. If so, flow is to 1006, where the discovery component of the terminal discovers the metadata associated with the track. At 1008, the user tags the music track for purchase and/or download. At 1010, the user transacts for purchase of the track. At 1012, the music is downloaded to the terminal and stored. At 1014, the music can be played via the terminal. If the user does not like the track, flow is from 1004 to 1016 to ignore tagging and/or purchase of the track. Flow is then back to 1000 to receive further music for presentation to the user.

Figure 11:
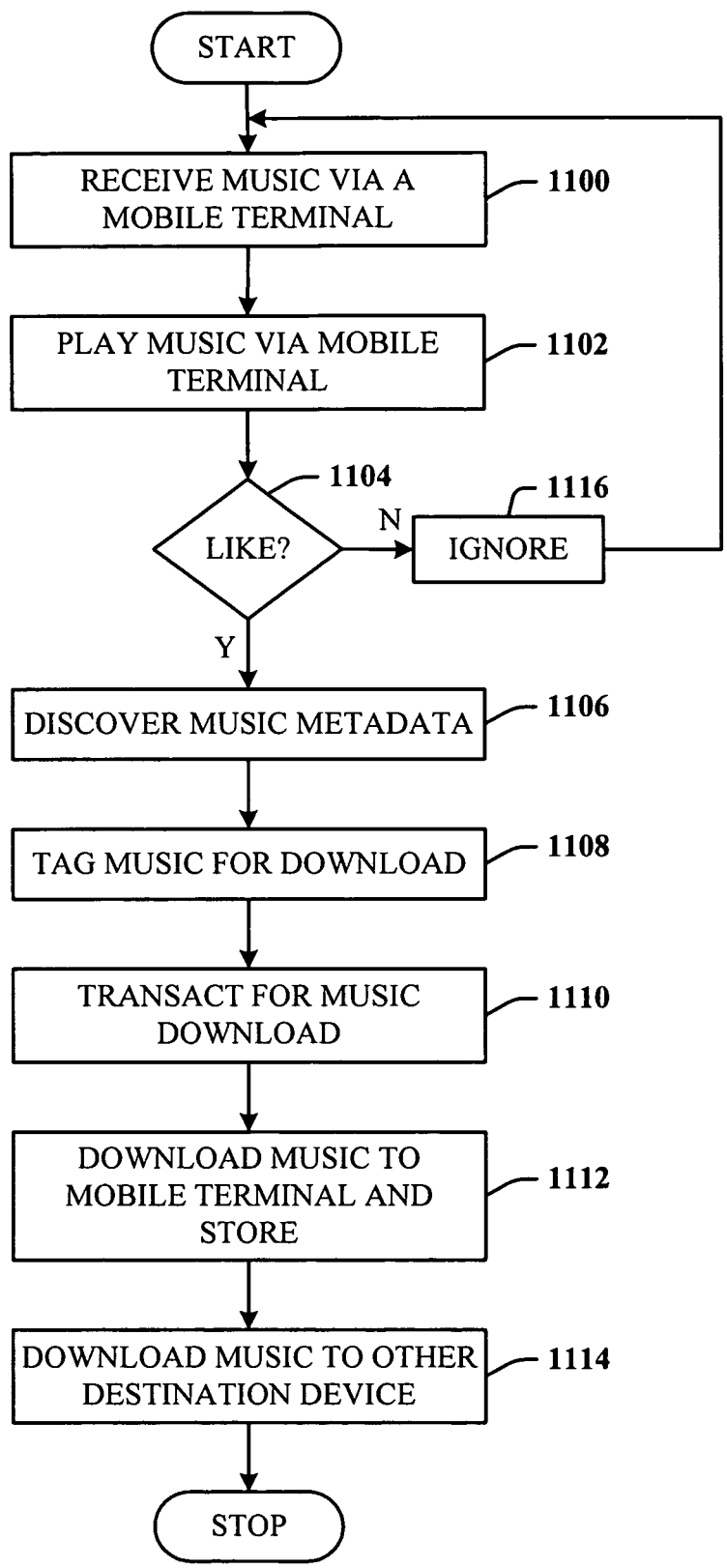
FIG. 11 illustrates a methodology of discovering music metadata and purchasing the music for download to another device.

FIG. 11 illustrates a methodology of discovering music metadata and purchasing the music for download to another device. At 1100, the mobile terminal is received for use. At 1102, the music is received by a radio channel and played. At 1104, the user determines if he or she likes the current playing selection. If so, flow is to 1106, where the discovery component of the terminal discovers the metadata associated with the track. At 1108, the user tags the music track for purchase and/or download. At 1110, the user transacts for purchase of the track. At 1112, the music is downloaded to the terminal and stored. At 1114, the music can be accessed and downloaded to another device of the user or anyone other person authorized to do so. Thus, multiple copies can be procured by a single user, and loaded on different user devices.

Figure 12:
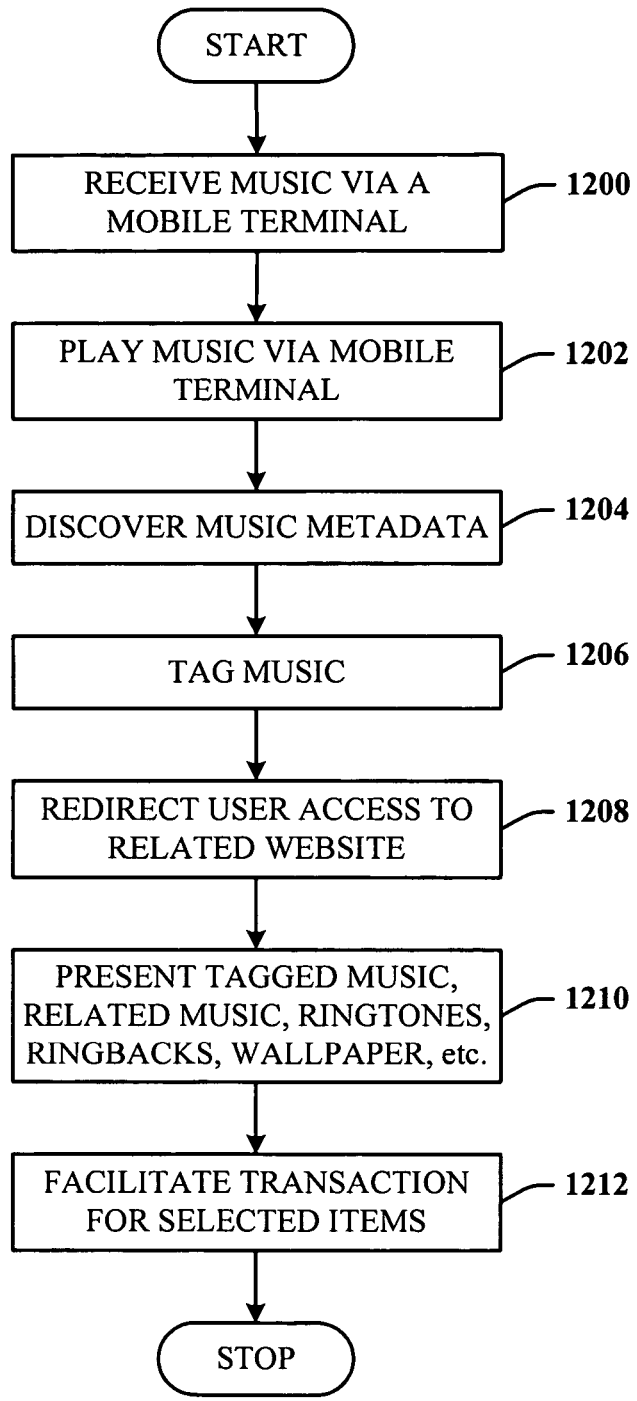
FIG. 12 illustrates a methodology of discovering music metadata and purchasing related items for download.

FIG. 12 illustrates a methodology of discovering music metadata and purchasing related items for download. At 1200, the mobile terminal is received for use. At 1202, the music is received by a radio channel and played. At 1204, the discovery component of the terminal discovers the metadata associated with the track. At 1206, the user tags one or more desired tracks. At 1208, user access is redirected to website via the mobile terminal. At 1210, the user tags the music track and/or related items (e.g., ringtone, ringback, wallpaper, etc.) for purchase and/or download. At 1212, the user transacts for purchase of the selected items.

Figure 13:
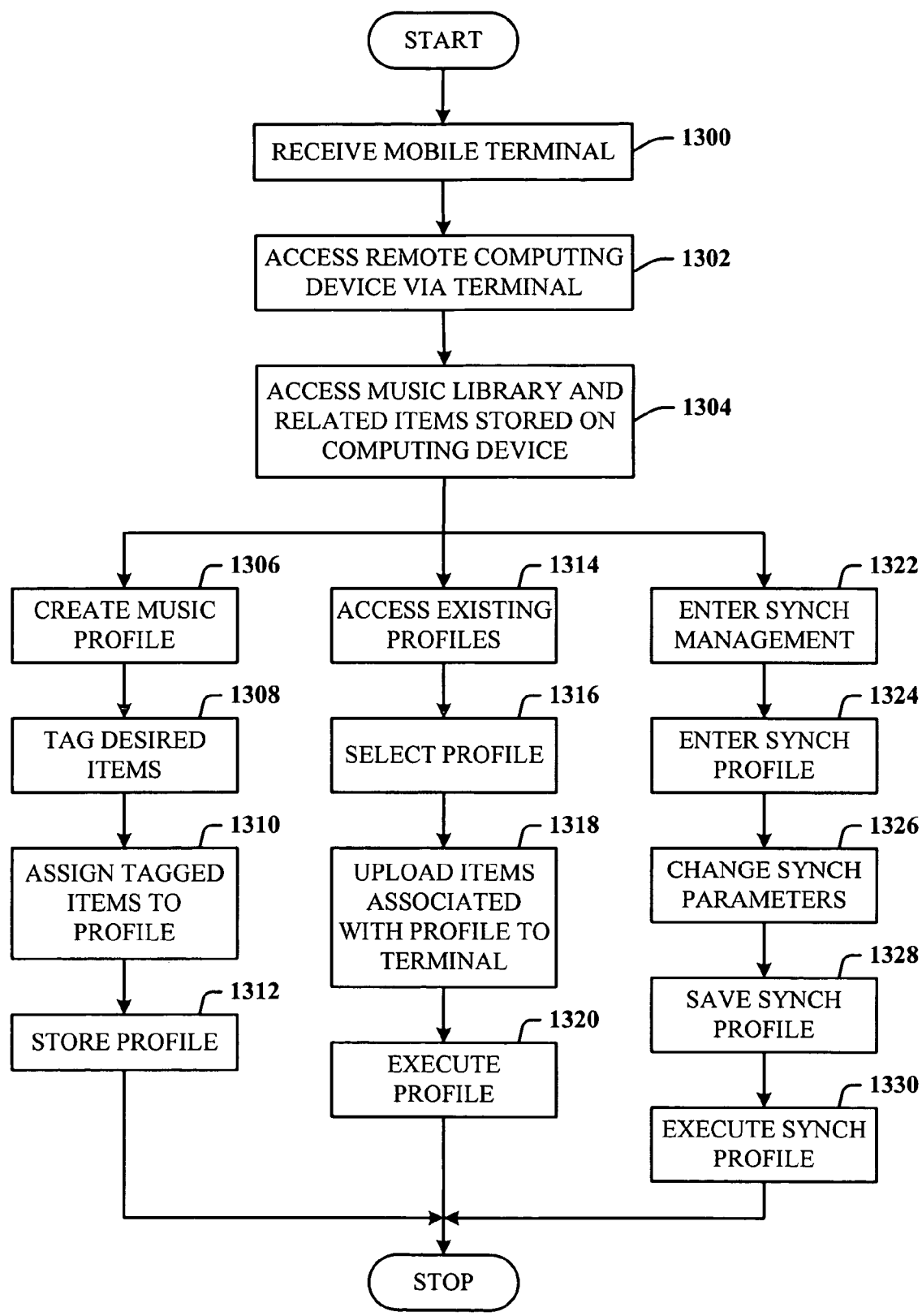
FIG. 13 illustrates a methodology of processing user profiles and synchronization management.

FIG. 13 illustrates a methodology of processing user profiles and synchronization management. At 1300, the mobile terminal is received for use. At 1302, a remote device is accessed for synchronization. At 1304, a music library and related items of the remote device (e.g., a desktop computer) is accessed for synchronization. At 1306, the user can access a profile algorithm that allows the user to create a music profile. At 1308, the user can tag selected items for upload to the mobile terminal. At 1310, the tagged items are assigned to the created profile. At 1312, the profile can then be stored for later use. At 1314, the software allows the user to access existing profiles for upload to the terminal. At 1316, the user can select a profile. At 1318, a selected profile and associated items (e.g., ringtone, ringback, wallpaper, etc.) can be uploaded to the terminal. At 1320, the profile can be executed on the mobile terminal for use. For example, the user can develop profiles for use during a desired event such as travel, for example. At 1322, the user can enable synchronization management. At 1324, the user can enter a synchronization profile such that synchronization can be performed in a desired way. For example, the synchronization can be performed with a certain device (e.g., the mobile terminal versus a portable computer). At 1326, the user can change synchronization parameters. For example, the user can make changes that only upload ringtones, or ringback parameters, rather than music tracks. Moreover, the profile can be configured for only certain tracks (e.g., country western versus hip hop genres of music). At 1328, the user saves the updated profile information. At 1330, the user can then choose to execute the synchronization profile for the given application.

Figure 14:
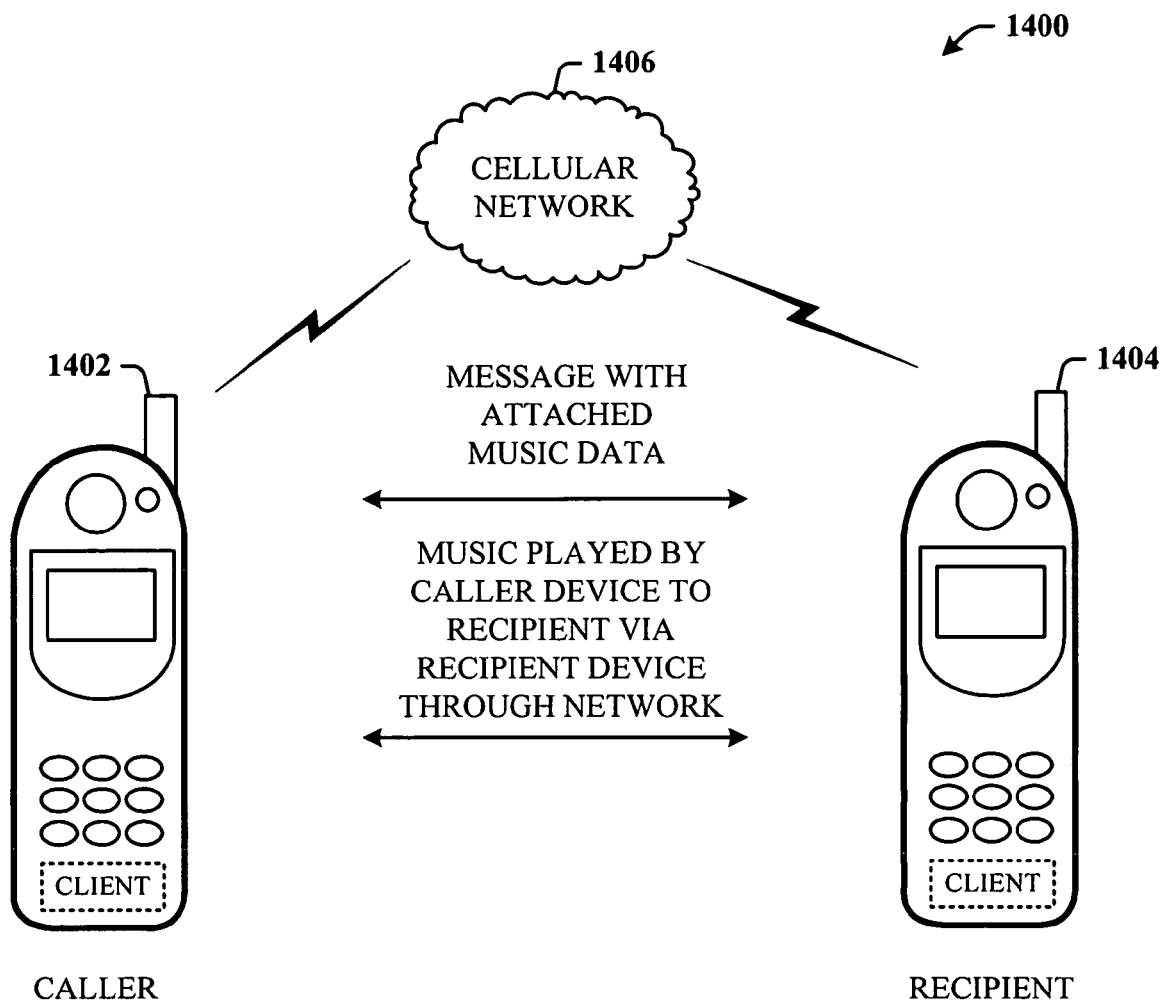
FIG. 14 illustrates a system whereby the music tracks can be transmitted from a first mobile terminal to a second mobile terminal via a cellular network.

FIG. 14 illustrates a system 1400 whereby the music tracks can be transmitted from a first mobile terminal 1402 to a second mobile terminal 1404 via a cellular network 1406. The terminal 1402 establishes communications with the second mobile terminal device 1404 (e.g., by calling) in order to transmit to the second device 1404 a music track already purchased, for example, by the user of the first terminal 1402. The music track can be transmitted via a message channel to the second terminal 1404. This can be as an attachment to a message of the message channel. Once received, the user of the second terminal can then play the received track either as a full version, or as a shortened version, which could require a code to unlock the transmitted version to access the full version. Alternatively, the first terminal 1402 could play the music track and transmit the playing version via the cellular network 1406 to the second terminal as music that can be perceived by the second user of the second terminal.

Figure 15:
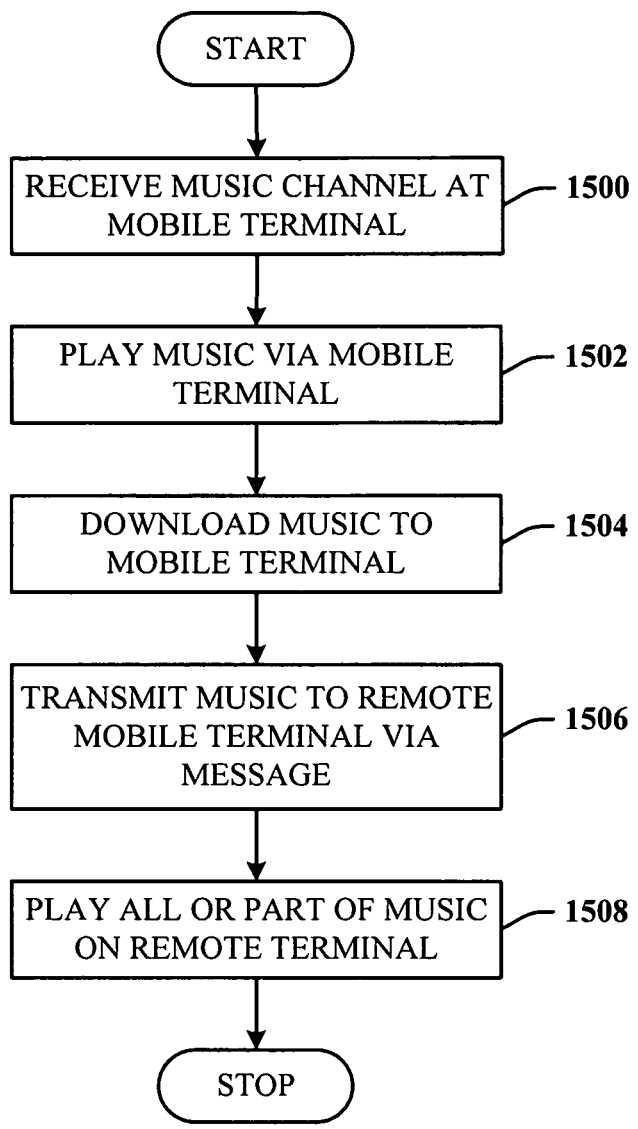
FIG. 15 illustrates a methodology of transmitting a track from a first terminal and playing of the transmitted track on a second terminal.

FIG. 15 illustrates a methodology of transmitting a track from a first terminal and playing of the transmitted track on a second terminal. At 1500, a music channel is received by a first mobile terminal. At 1502, the music is played at the first terminal. At 1504, the track is downloaded to the first terminal, as selected and desired by a first user of the first terminal. At 1506, the downloaded track is transmitted to a second terminal via a message attachment. At 1508, a shortened version or the full version of the track is played on the second terminal. Where the shortened version is played, this facilitates protection such that the second user would be allowed to listen to some of the track, but not the full version until by way of purchase, an unlocking key would be transmitted to unlock the full version for play. In another implementation, the first user is allowed the full version, and thereafter, and other user is automatically allowed to perceive the full version, even if transmitted to a different terminal. Unauthorized protection can be employed in the cellular network such that if it is detected that transmission of a purchased version is detected as going to an unauthorized second terminal, the shortened or unlocked version is automatically enabled via the transmission such that the second user cannot listen to the full version, but only the shortened version.

Figure 16:
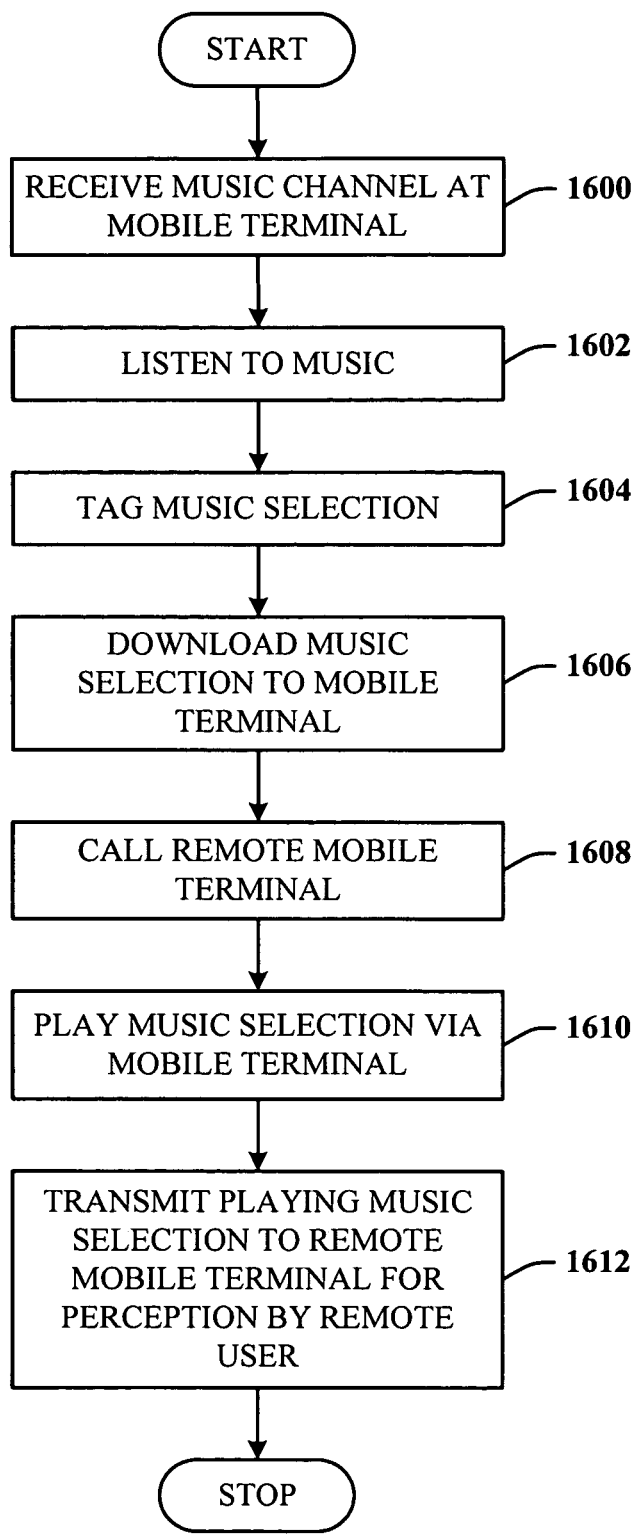
FIG. 16 illustrates a methodology of communicating a full version track while playing to a second terminal of a second user for listening by the second user.

FIG. 16 illustrates a methodology of communicating a full version track while playing to a second terminal of a second user for listening by the second user. At 1600, a mobile terminal is received for playing a sound track of a radio channel. At 1602, the user listens to the track. At 1604, the user tags the selection. At 1606, the user downloads the tagged selection to the mobile terminal. At 1608, the user calls a second user of a remote (or second) mobile terminal. At 1610, the first user plays the music selection on the first terminal. At 1612, the playing music is transmitted to the remote terminal for perception by the second user.

Figure 17:
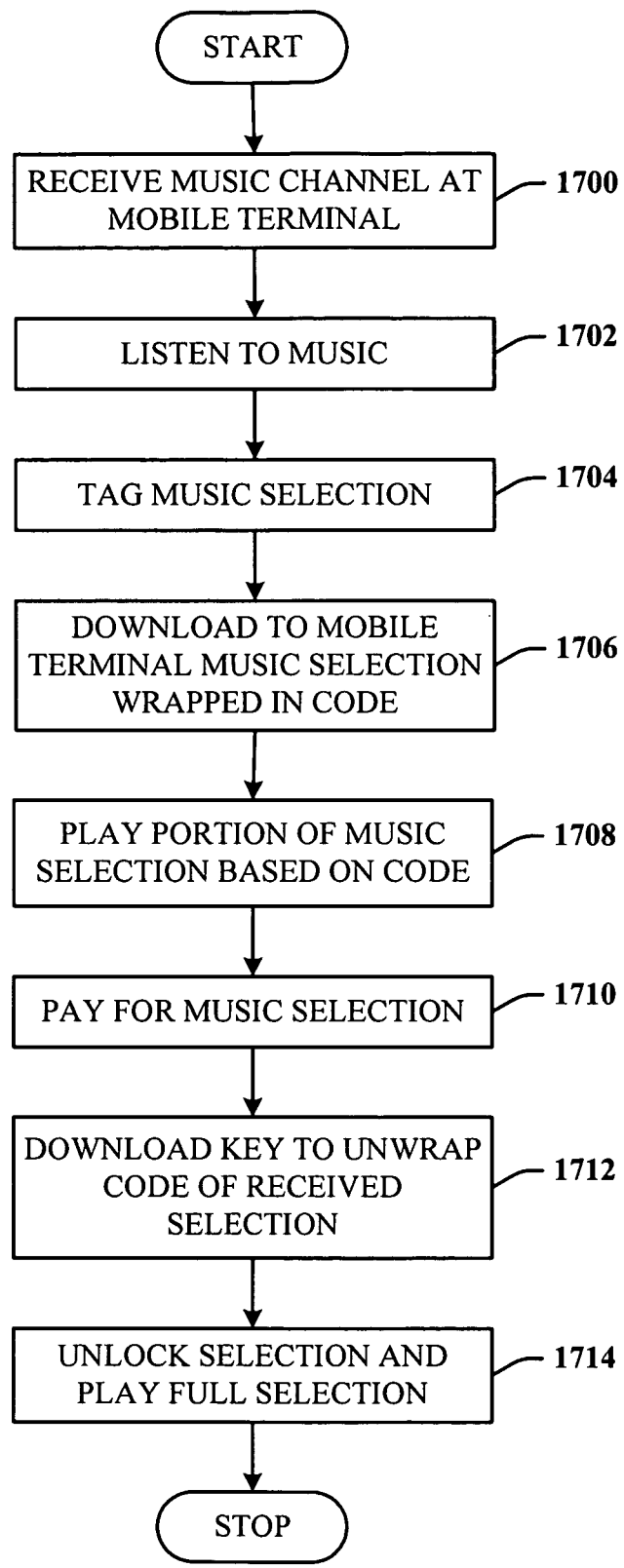
FIG. 17 illustrates a methodology of tagging and downloading for preview a music selection.

FIG. 17 illustrates a methodology of tagging and downloading for preview a music selection. At 1700, a mobile terminal is received for playing music of a radio source. At 1702, the user listens to music received from the source. At 1704, the user tags a selection for preview. At 1706, the tagged selection (or selections) is downloaded to the user's mobile terminal (and/or other user system). Here, the tagged selection is wrapped in a code that prevents access to listening to the full version of the selection. However, a short preview version is supplied such that the user can listen to portions of the selection, as indicated at 1708. At 1710, the user decides to purchase the selection by transacting to buy the selection via the mobile terminal. At 1712, once payment has been received and validated, the radio source, or a representative thereof, transmits a key that unlocks the preview version into the full version. At 1714, the user can then play the full version of the selection o the mobile terminal.

Figure 18:
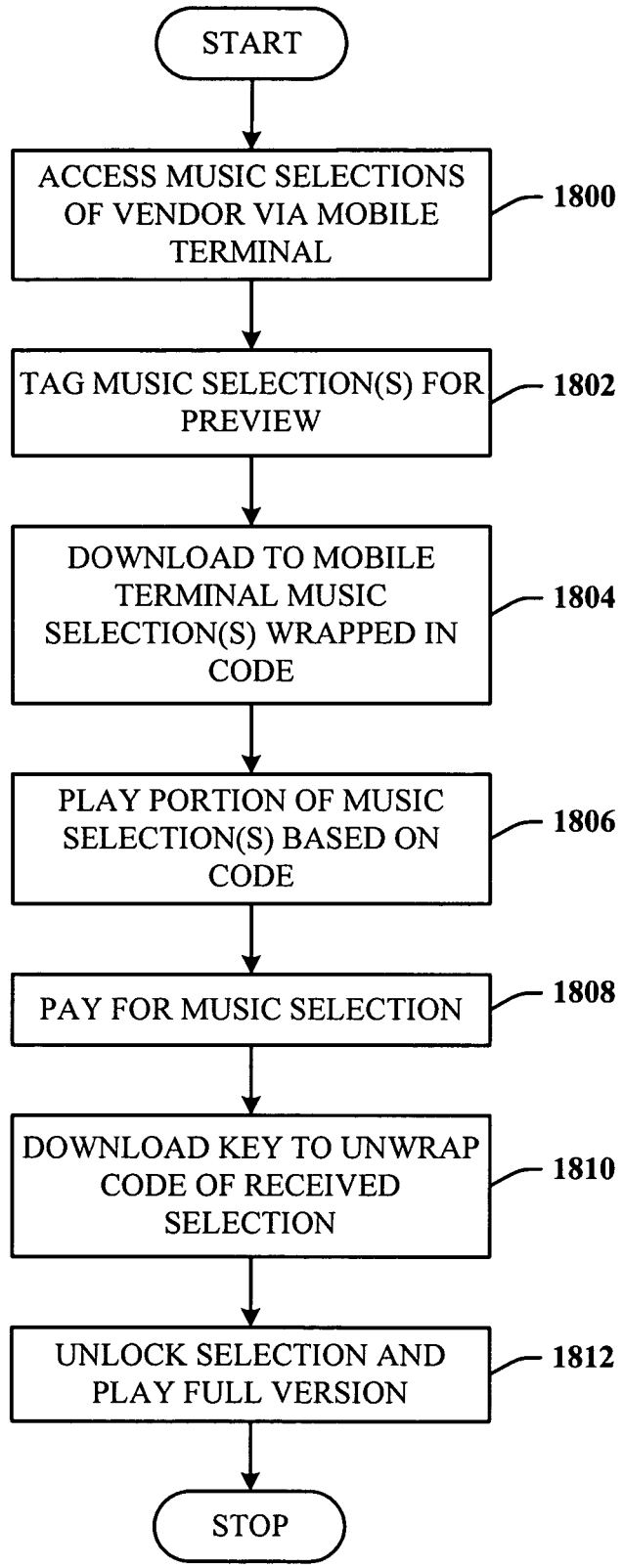
FIG. 18 illustrates a methodology of accessing, tagging and downloading from a vendor site, one or more music selections via a mobile terminal.

FIG. 18 illustrates a methodology of accessing, tagging and downloading from a vendor site, one or more music selections via a mobile terminal. At 1800, the terminal user accesses a vendor website of music selection via the user's mobile terminal. At 1802, the vendor site presents on the mobile terminal one or more music tracks for selection. At 1804, the user initiates download of the selected tracks to the terminal. Note that this can occur as a background function such that where the terminal is a cell phone, for example, the user can operate the cell phone normally (e.g., make a call) while the selections are being downloaded to the phone.

At 1806, the user can choose to play the selected tracks on the terminal. This can be configured in one mode as a manual operation such that the user must interact manually with the mobile terminal to initiate play of the tracks. In another mode, an automatic mode, the downloaded selections are automatically played sequentially. Since the wrapped selections have yet to be unlocked, the terminal can play the shortened versions to the user automatically. User interaction can further tag or untag downloaded selections for purchase. Untagged versions can be configured to age out of the terminal system after a predetermined period of time (e.g., minutes, hours, days), while tagged selections at the terminal can be set for purchase. At 1808, the user initiates payment of the tagged selections. At 1810, the vendor transmits or causes to be transmitted to the user terminal a key (or keys) that unlock the purchased selections. At 1812, the terminal processes the key to unlock the selections for full-version play.

It is to be appreciated that once a user exposes buying habits and preferences with a cellular service, for example, this information can be tracked, processed and analyzed in order to anticipate or predict, what the user might want relative to a future selection. For example, if the terminal user has downloaded country music in the past, it is likely with some degree of certainty that the user will again download a country music selection in the future. Knowing this, the carrier and/or associated vendor can push new releases of country music tracks to the terminal user when the tracks become available for download as a means to entice the user to purchase, listen to (for air time charges), and/or purchase. Notification to the mobile terminal can also be phone message to the user's mailbox, by SMS (short message service) and/or MMS (multimedia messaging service) technology, for example. This can be a service to which the user subscribes.

Figure 19:
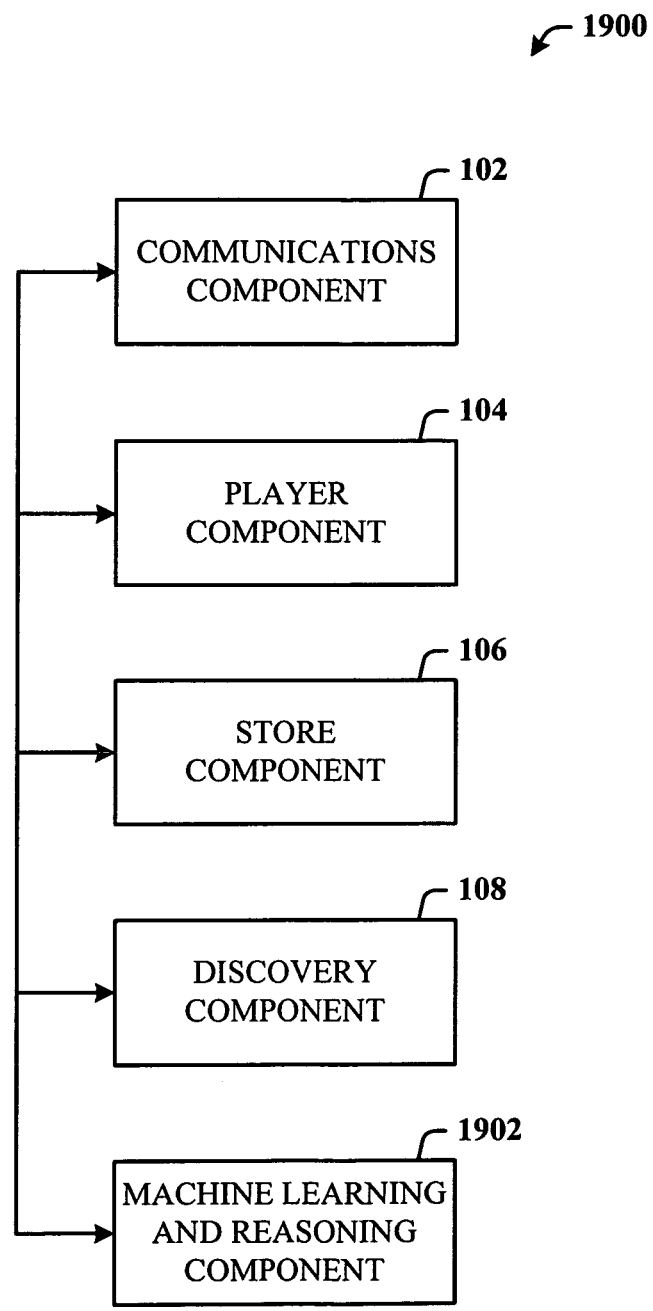
FIG. 19 illustrates a system that employs a machine learning and reasoning component that facilitates automating one or more features in accordance with the subject innovation.

FIG. 19 illustrates a system 1900 that employs a machine learning and reasoning (MLR) component 1902 which facilitates automating one or more features in accordance with the subject innovation. The subject invention (e.g., in connection with selection) can employ various artificial intelligence-based schemes for carrying out various aspects thereof. For example, a process for determining which terms, sets of terms, phrases, and/or sentences to use in system and/or user training can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed.

A support vector machine is an example of a classifier that can be employed. The support vector machine operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions. For example, based upon user interaction with the mobile terminal, the MLR component 1902 can automate actions that in the past were performed repeatedly by the user. In another example, the MLR component 1902 can learn that the user frequently logs-in to a vendor site to check for new releases of a particular artist. At some point in time, the MLR component can automate this process for the user. Thereafter, if the user chooses disable this automation, he or she can do so. Another example includes automating short-version play of tunes that are downloaded for preview. As indicated supra, the user can manually initiate play of the selections. Alternatively, the MLR component 1902 can learn and automate this process for the user when downloads occur based on past user interaction.

It can be appreciated that the MLR component 1902 can be employed to learn and reason about many aspects of the subject invention. For example, the user selection of ringtones, ringbacks, wallpaper, etc., can be automated based on past user interaction and selections. The MLR component 2002 can reason that with some degree of certainty that the user will like to see a new wallpaper displayed on the terminal each month, based on past user interaction. A new ringtone can be enabled, for example, and operation of the mobile terminal altered according to user interaction therewith. These are only but a few examples of the capabilities that can be provided by the use of the MLR component 1902.

Figure 20:
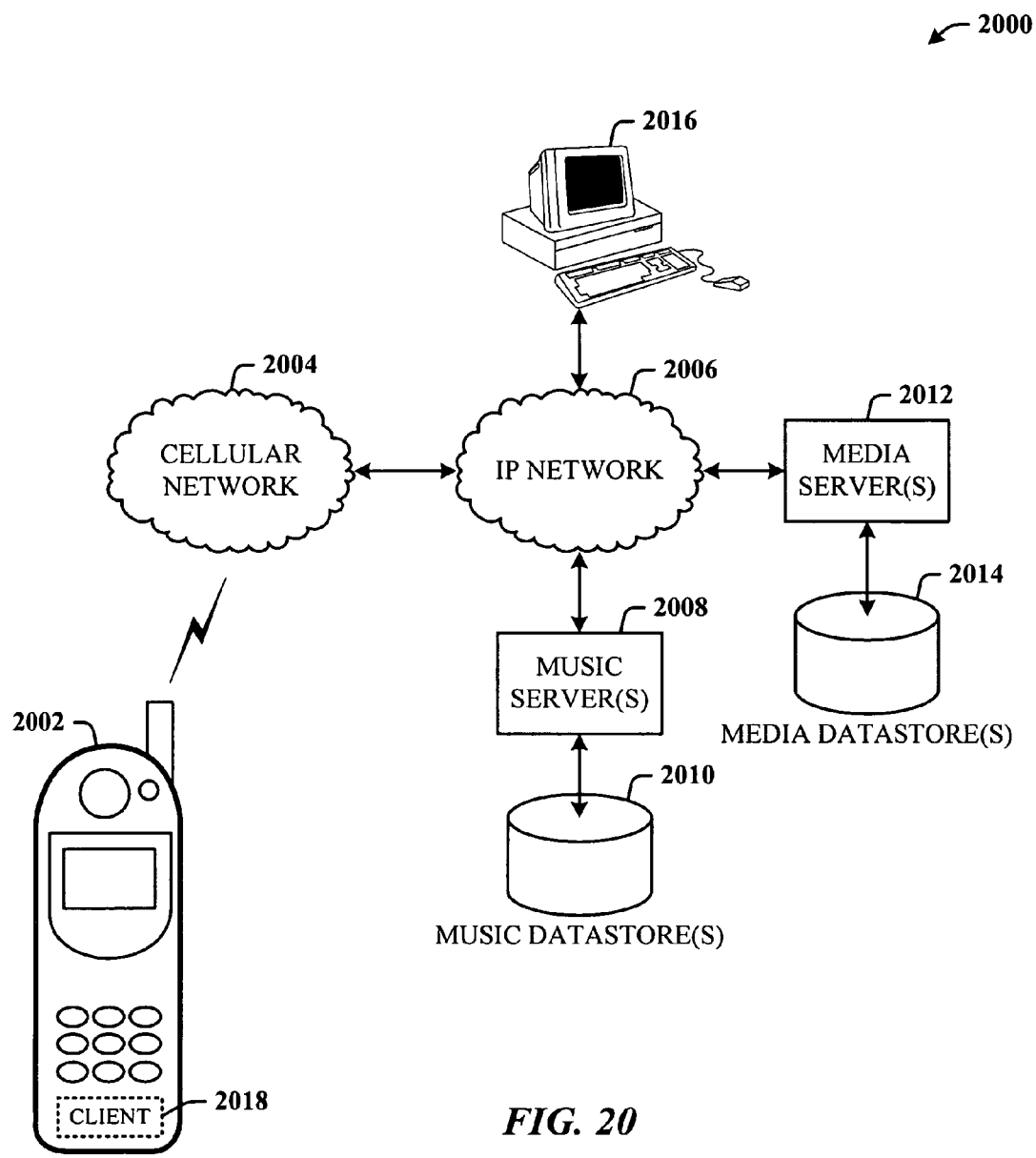
FIG. 20 illustrates an exemplary cellular system that can employ the architecture of the subject innovation.

FIG. 20 illustrates an exemplary cellular system 2000 that can employ the architecture of the subject innovation. A mobile terminal 2002 (e.g., a cell phone) communicates over a cellular network 2004 (e.g., 2G, 2.5G, 3G (UMTS), 4G, HSDPA, . . . ). The cellular network 1204 interfaces to an IP network 2006 (e.g., the Internet) via, for example, an IMS (IP multimedia subsystem) component (not shown) such that access is provided to multimedia content (e.g., music tracks) which can be provided by vendor music server(s) 2008 which include one or more associated music datastores 2010. The music datastores 2010 store music tracks for selection and download to the mobile terminal 2002. Similarly, residing on the IP network 2006 can also be one or more media server(s) and associated media datastores 2014 that store multimedia content (e.g., text, audio, video, graphics, . . . ). Also disposed on the IP network can be a computer system 2016 of the user such that although the user makes music selections via the terminal 2002, the selections (e.g., music, ringtones, ringbacks, wallpaper, . . . ) can be downloaded to the user computer 2016. Thereafter, the user can synchronize the terminal 2002 with the computer 2016 for upload/download of the desired items.

The mobile terminal 2002 can include a client 2018 that comprises the player component 104, store component 106, and the discovery component 108 of FIG. 1, and synchronization component (RSM). The client 2018 facilitates the tagging of a music selection while being played, the accessing of a website and/or vendor site for further perusal and selection of items, the download/upload synchronization with another device (e.g., a computer), and many other aspects of the subject invention. Note that the music and/or media servers can also be disposed on the cellular network 2004 for access by the subscriber of the mobile terminal handset.

Note that the system is suitably robust that when the user is listening to content while in a structure (e.g., a home), and the user leaves the home (goes outdoors), the content can be transmitted uninterruptedly to the terminal 2002.

Figure 21:
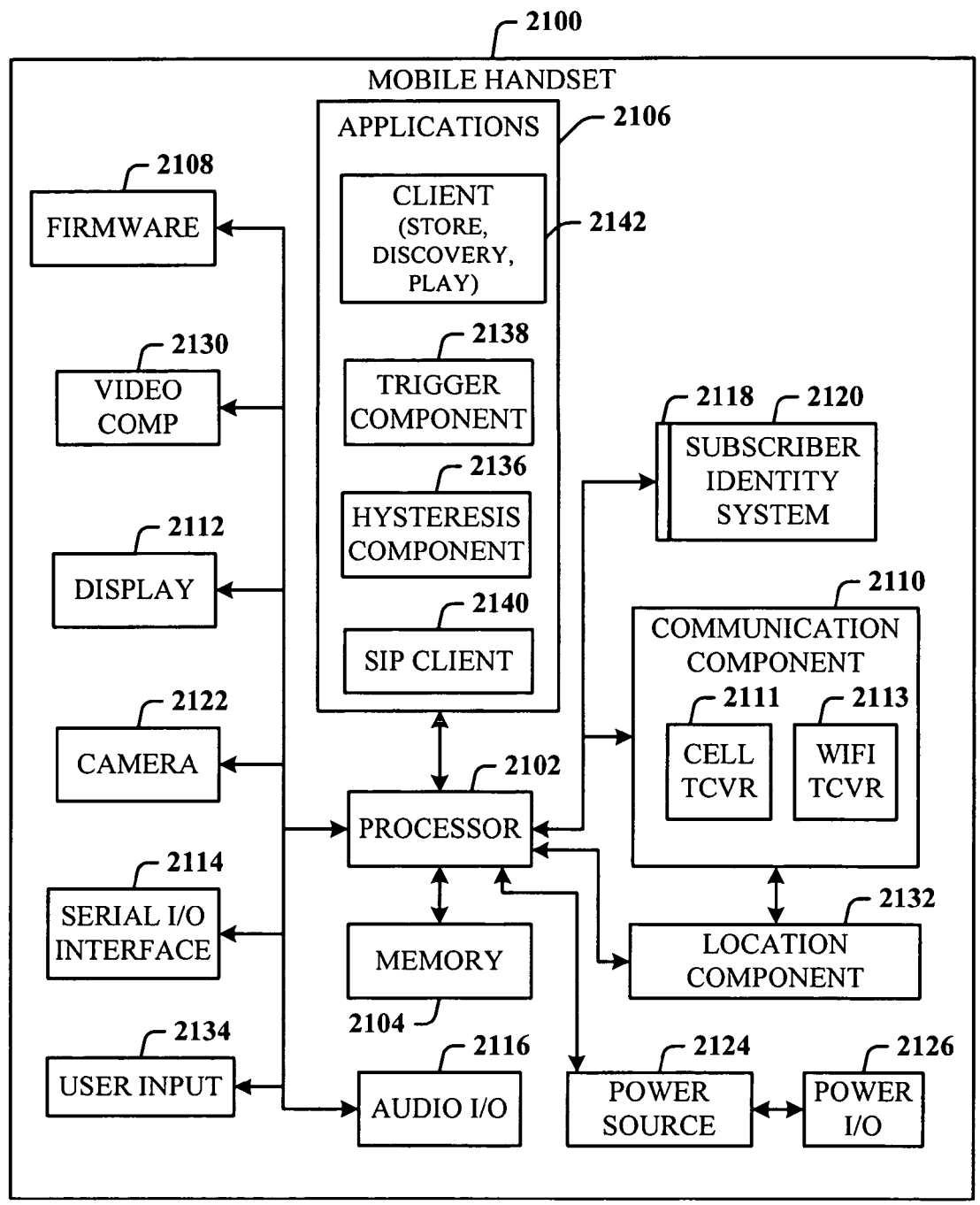
FIG. 21 illustrates a mobile handset that can process multimedia content in accordance with the subject innovation.

FIG. 21 illustrates a schematic block diagram of a mobile handset 2100 in accordance with an innovative aspect. In order to provide additional context for various aspects thereof, FIG. 21 and the following discussion are intended to provide a brief, general description of a suitable environment 2100 in which the various aspects of the innovation can be implemented. While the description includes a general context of computer-executable instructions, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media can include, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 2100 includes a processor 2102 for controlling and processing all onboard operations and functions. A memory 2104 interfaces to the processor 2102 for storage of data and one or more applications 2106 (e.g., a video player software, user feedback component software, etc.). Other applications can include voice recognition of predetermined voice commands that facilitate initiation of the user feedback signal, as well as those described infra. The applications 2106 can be stored in the memory 2104 and/or in a firmware 2108, and executed by the processor 2102 from either or both the memory 2104 or/and the firmware 2108. The firmware 2108 can also store startup code for execution in initializing the handset 2100. A communications component 2110 interfaces to the processor 2102 to facilitate wired/wireless communication with external systems, e.g., cellular networks, VoIP networks, and so on. Here, the communications component 2110 can also include a suitable cellular transceiver 2111 (e.g., a GSM transceiver) and an unlicensed transceiver 2113 (e.g., WiFi, WiMax) for corresponding signal communications. The handset 2100 can be a device such as a cellular telephone, a PDA with mobile communications capabilities, and messaging-centric devices. The communications component 2110 also facilitates communications reception from terrestrial radio networks (e.g., broadcast), digital satellite radio networks, and Internet-based radio services networks.

The handset 2100 includes a display 2112 for displaying text, images, video, telephony functions (e.g., a Caller ID function), setup functions, and for user input. The display 2112 can also accommodate the presentation of multimedia content (e.g., music metadata, messages, wallpaper, graphics, . . . ). A serial I/O interface 2114 is provided in communication with the processor 2102 to facilitate wired and/or wireless serial communications (e.g., USB, and/or IEEE 1394) via a hardwire connection, and other serial input devices (e.g., a keyboard, keypad, and mouse). This supports updating and troubleshooting the handset 2100, for example. Audio capabilities are provided with an audio I/O component 2116, which can include a speaker for the output of audio signals related to, for example, indication that the user pressed the proper key or key combination to initiate the user feedback signal. The audio I/O component 2116 also facilitates the input of audio signals via a microphone to record data and/or telephony voice data, and for inputting voice signals for telephone conversations.

The handset 2100 can include a slot interface 2118 for accommodating a SIC (Subscriber Identity Component) in the form factor of a card Subscriber Identity Module (SIM) or universal SIM 2120, and interfacing the SIM card 2120 with the processor 2102. However, it is to be appreciated that the SIM card 2120 can be manufactured into the handset 2100, and updated by downloading data and software thereinto.

The handset 2100 can process IP data traffic via the communication component 2110 to accommodate IP traffic from an IP network such as, for example, the Internet, a corporate intranet, a home network, a person area network, etc., via an ISP or broadband cable provider. Thus, VoIP traffic can be utilized by the handset 2100 and IP-based multimedia content can be received in either an encoded or decoded format.

A video processing component 2122 (e.g., a camera) can be provided for decoding encoded multimedia content. The handset 2100 also includes a power source 2124 in the form of batteries and/or an AC power subsystem, which power source 2124 can interface to an external power system or charging equipment (not shown) via a power I/O component 2126.

The handset 2100 can also include a video component 2130 for processing video content received and, for recording and transmitting video content. A location tracking component 2132 facilitates geographically locating the handset 2100. As described hereinabove, this can occur when the user initiates the feedback signal automatically or manually. A user input component 2134 facilitates the user initiating the quality feedback signal. The input component can include such conventional input device technologies such as a keypad, keyboard, mouse, stylus pen, and touch screen, for example.

Referring again to the applications 2106, a hysteresis component 2136 facilitates the analysis and processing of hysteresis data, which is utilized to determine when to associate with the access point. A software trigger component 2138 can be provided that facilitates triggering of the hysteresis component 2138 when the WiFi transceiver 2113 detects the beacon of the access point. A SIP client 2140 enables the handset 2100 to support SIP protocols and register the subscriber with the SIP registrar server. The applications 2106 can also include a client 2142 that provides at least the capability of discovery, play and store of multimedia content, for example, music.

The handset 2100, as indicated supra related to the communications component 2110, includes an indoor network radio transceiver 2113 (e.g., WiFi transceiver). This function supports the indoor radio link, such as IEEE 802.11, for the dual-mode GSM handset 2100. The handset 2100 can accommodate at least satellite radio services through a handset that can combine wireless voice and digital radio chipsets into a single handheld device.

Figure 22:
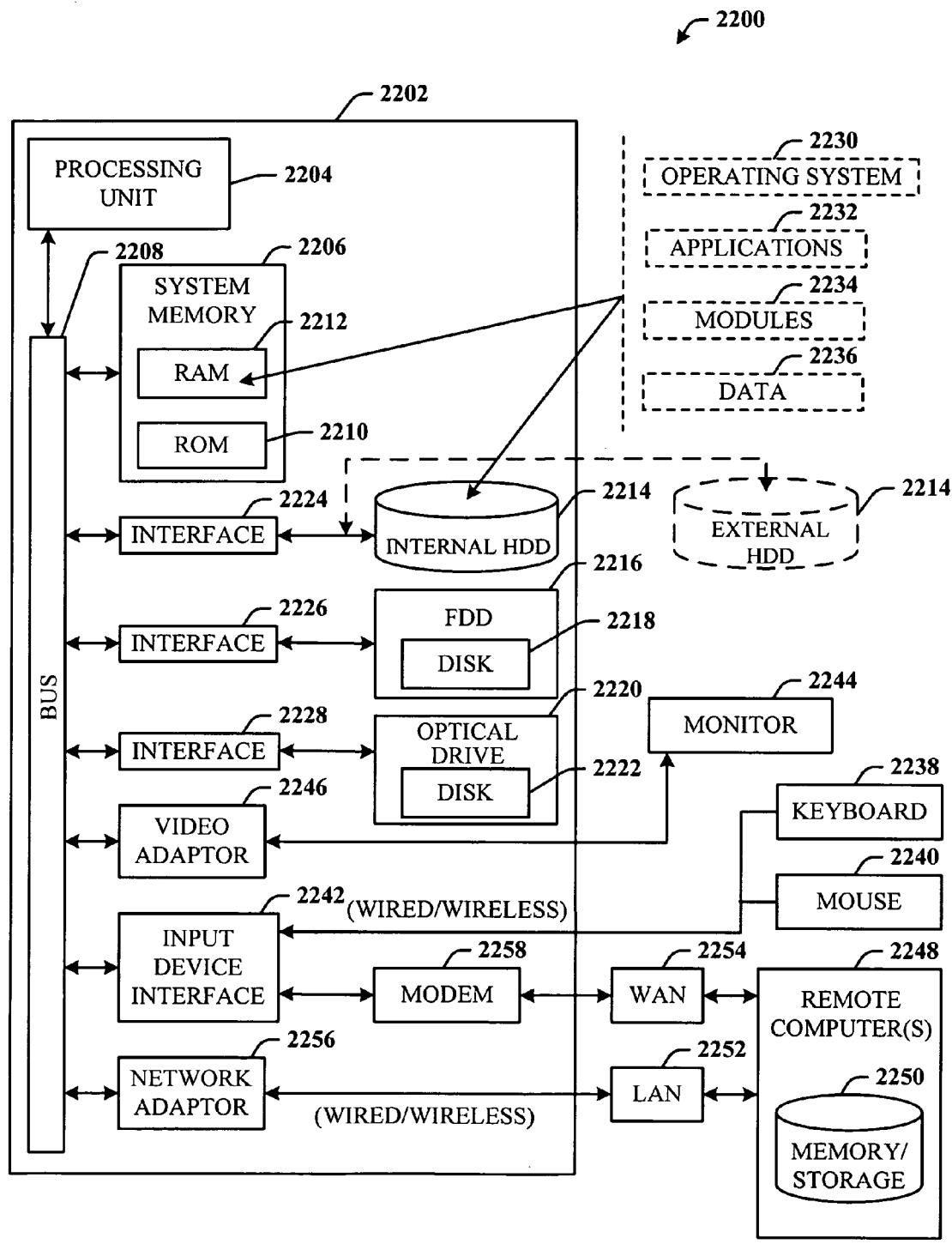
FIG. 22 illustrates illustrated a block diagram of a computer operable to execute the disclosed music-centric client and/or remote synchronization management architecture.

Referring now to FIG. 22, there is illustrated a block diagram of a computer operable to execute the disclosed music-centric client and/or remote synchronization management architecture. In order to provide additional context for various aspects thereof, FIG. 22 and the following discussion are intended to provide a brief, general description of a suitable computing environment 2200 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 22, the exemplary environment 2200 for implementing various aspects includes a computer 2202, the computer 2202 including a processing unit 2204, a system memory 2206 and a system bus 2208. The system bus 2208 couples system components including, but not limited to, the system memory 2206 to the processing unit 2204. The processing unit 2204 can be any of various commercially available processors. Dual microprocessors and other multi-processor architectures may also be employed as the processing unit 2204.

The system bus 2208 can be any of several types of bus structure that may further interconnect to a memory bus (with or without a memory controller), a peripheral bus, and a local bus using any of a variety of commercially available bus architectures. The system memory 2206 includes read-only memory (ROM) 2210 and random access memory (RAM) 2212. A basic input/output system (BIOS) is stored in a non-volatile memory 2210 such as ROM, EPROM, EEPROM, which BIOS contains the basic routines that help to transfer information between elements within the computer 2202, such as during start-up. The RAM 2212 can also include a high-speed RAM such as static RAM for caching data.

The computer 2202 further includes an internal hard disk drive (HDD) 2214 (e.g., EIDE, SATA), which internal hard disk drive 2214 may also be configured for external use in a suitable chassis (not shown), a magnetic floppy disk drive (FDD) 2216, (e.g., to read from or write to a removable diskette 2218) and an optical disk drive 2220, (e.g., reading a CD-ROM disk 2222 or, to read from or write to other high capacity optical media such as the DVD). The hard disk drive 2214, magnetic disk drive 2216 and optical disk drive 2220 can be connected to the system bus 2208 by a hard disk drive interface 2224, a magnetic disk drive interface 2226 and an optical drive interface 2228, respectively. The interface 2224 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 2202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 2212, including an operating system 2230, one or more application programs 2232, other program modules 2234 and program data 2236. All or portions of the operating system, applications, modules, and/or data can also be cached in the RAM 2212. It is to be appreciated that the innovation can be implemented with various commercially available operating systems or combinations of operating systems.

A user can enter commands and information into the computer 2202 through one or more wired/wireless input devices, e.g., a keyboard 2238 and a pointing device, such as a mouse 2240. Other input devices (not shown) may include a microphone, an IR remote control, a joystick, a game pad, a stylus pen, touch screen, or the like. These and other input devices are often connected to the processing unit 2204 through an input device interface 2242 that is coupled to the system bus 2208, but can be connected by other interfaces, such as a parallel port, an IEEE 1394 serial port, a game port, a USB port, an IR interface, etc.

A monitor 2244 or other type of display device is also connected to the system bus 2208 via an interface, such as a video adapter 2246. In addition to the monitor 2244, a computer typically includes other peripheral output devices (not shown), such as speakers, printers, etc.

The computer 2202 may operate in a networked environment using logical connections via wired and/or wireless communications to one or more remote computers, such as a remote computer(s) 2248. The remote computer(s) 2248 can be a workstation, a server computer, a router, a personal computer, portable computer, microprocessor-based entertainment appliance, a peer device or other common network node, and typically includes many or all of the elements described relative to the computer 2202, although, for purposes of brevity, only a memory/storage device 2250 is illustrated. The logical connections depicted include wired/wireless connectivity to a local area network (LAN) 2252 and/or larger networks, e.g., a wide area network (WAN) 2254. Such LAN and WAN networking environments are commonplace in offices and companies, and facilitate enterprise-wide computer networks, such as intranets, all of which may connect to a global communications network, e.g., the Internet.

When used in a LAN networking environment, the computer 2202 is connected to the local network 2252 through a wired and/or wireless communication network interface or adapter 2256. The adaptor 2256 may facilitate wired or wireless communication to the LAN 2252, which may also include a wireless access point disposed thereon for communicating with the wireless adaptor 2256.

When used in a WAN networking environment, the computer 2202 can include a modem 2258, or is connected to a communications server on the WAN 2254, or has other means for establishing communications over the WAN 2254, such as by way of the Internet. The modem 2258, which can be internal or external and a wired or wireless device, is connected to the system bus 2208 via the serial port interface 2242. In a networked environment, program modules depicted relative to the computer 2202, or portions thereof, can be stored in the remote memory/storage device 2250. It will be appreciated that the network connections shown are exemplary and other means of establishing a communications link between the computers can be used.

The computer 2202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates access to media services, comprising:

a memory that stores computer-executable instructions; and a processor, communicatively coupled to the memory, that facilitates execution of the computer-executable instructions to perform operations, comprising:

initiating communication with a first remote component via a transceiver; and receiving first content and first content metadata describing the first content from the first remote component;

facilitating a presentation of the first content;

storing the first content and the first content metadata;

receiving an indication of a complete version of the first content being requested;

forwarding the first content metadata directed to a second remote component;

receiving from the second remote component second content, wherein the first content is at least a portion of the second content, the second content is determined based on the first content metadata, the second content comprises an unencoded preview portion and an encoded portion, and the unencoded preview is unencoded for presentment without decoding;

receiving an indication that the encoded portion of the second content is decodable for presentment after the decoding; and forwarding payment information representing a payment to the second remote component to facilitate the decoding of the encoded portion of the second content for presentment.

2. The system of claim 1, wherein the first content is music content, the first remote component is a radio station transmitter, and the first content metadata comprises a title of the music content.

3. The system of claim 1, wherein the first content metadata comprises a property of the first content.

4. The system of claim 1, wherein the first content metadata is an artist name associated with the first content.

5. The system of claim 1, wherein the operations further comprise facilitating a purchase of the encoded portion of the second content from the a second remote component.

6. The system of claim 1, wherein the operations further comprise facilitating a tagging of the encoded portion of the second content for purchase while the first content is presented.

7. The system of claim 1, wherein the first content is music content, and the first remote component is a broadcast radio network device.

8. The system of claim 1, wherein the operations further comprise processing the first content and the first content metadata to determine an action to be performed.

9. The system of claim 1, wherein the forwarding of the first content metadata to the first remote component occurs in conjunction with the first content being presented.

10. The system of claim 1, wherein the operations further comprise, in response to expiration of a predetermined period of time during which the unencoded preview portion has not been accessed, deleting the first content and the first content metadata from the storage component, and deleting the unencoded preview portion and the encoded portion.

11. A system that facilitates access to media services, comprising:

a memory including computer-executable instructions; and a processor, communicatively coupled to the memory, that facilitates execution of the computer-executable instructions to perform operations, comprising:

receive receiving first music content and first music metadata from a music source, the first music metadata identifies the first music content; and playing the first music content;

generating a request for additional information regarding the first music content, wherein the request is generated subsequent to the first music content being played;

forwarding the request including the first music metadata to a remote component;

receiving, from the remote component, second music content based on the first music metadata, wherein the first music content comprises at least a portion of the second music content and the second music content comprises an unencoded preview portion and an encoded portion;

directing a transmission of the second music content to a voice message inbox; and playing the unencoded preview portion in response to an access of the voice message inbox, wherein the encoded portion becomes available in response to payment being determined to have been transmitted to the remote component for access to the encoded portion.

12. The system of claim 11, wherein the music source is a satellite radio network device.

13. The system of claim 11, wherein the operations further comprise facilitating forwarding of a copy of the second music content comprising the unencoded preview portion and the encoded portion to a remotely located computing device.

14. The system of claim 13, wherein the unencoded preview portion of the copy of the second music content is available for review on the remotely located computing device without a delay and the encoded portion of the copy of the second music content is available for review on the remotely located computing device in response to determining payment from the remotely located computing component has been received.

15. The system of claim 11, wherein the music source is a speaker device.

16. The system of claim 11, wherein the first music metadata comprises a title of the first music content.

17. The system of claim 11, wherein the first music metadata further facilitates access to an item related to the first music content.

18. The system of claim 17, wherein the item is a ringtone.

19. A mobile handset, comprising:
a memory to store computer-executable instructions; and
a processor, communicatively coupled to the memory, that facilitates execution of the computer-executable instructions to perform operations, comprising:
receive receiving a first content and first content metadata from a remote device playing the first content;
forwarding the first content metadata to a content server accessible via a cellular network;
receiving, from the content server, second content associated with the first content metadata, wherein the second content comprises an unencoded preview portion and an encoded portion; and
forwarding the unencoded preview version to a voice message inbox to facilitate presentment of the unecoded preview portion.

20. The mobile handset of claim 19, wherein the operations further comprise communicating the first content and the first content metadata to a remote handset, wherein the first content and the first content metadata is communicated as an attachment to a message.

21. The mobile handset of claim 19, wherein the operations further comprise communicating the first content and the first content metadata to a remote handset via a short message service message.

22. The mobile handset of claim 19, wherein the operations further comprise communicating the first content and the first content metadata to a remote handset via a multimedia message service message.

23. The mobile handset of claim 19, wherein the operations further comprise communicating the first content and the first content metadata to a remote handset during a voice call while the first content is being played.

24. The mobile handset of claim 19, wherein the operations further comprise facilitating synchronization of the first content and the first content metadata between the mobile handset and a disparate mobile handset.

25. The mobile handset of claim 24, wherein the synchronization is performed by exchange of a memory card.

26. The mobile handset of claim 24, wherein the synchronization is performed by wireless communications.

27. The mobile handset of claim 24, wherein the synchronization is performed by a tethered communication link.

28. The mobile handset of claim 19, wherein the first content is music content received as streaming content.

29. The mobile handset of claim 19, wherein the operations further comprise facilitating access to the voice message inbox to play the encoded preview portion and initiate a purchase of the encoded portion.

30. The mobile handset of claim 19, wherein the operations further comprise unlocking the encoded portion to facilitate formation of a full version of the second content to be available at the mobile handset, wherein the full version comprises the unencoded preview portion combined with the encoded portion as unlocked, and wherein the full version is playable in its entirety.

31. The mobile handset of claim 19, wherein, in response to the voice message inbox being determined to be accessed, the unencoded preview version is played.

32. The mobile handset of claim 19, wherein the operations further comprise facilitating synchronization of the first content and the first content metadata between the mobile handset and another portable computer.

33. A method comprising:
receiving, by a system including a processor, first content and first content metadata from a network device of a cellular network;
storing, by the system, the first content and the first content metadata;
playing, by the system, the first content;
forwarding, by the system, the first content metadata to a remote server;
receiving, by the system, an unencoded preview version of second content to a voice message inbox, wherein the second content is associated with the first content metadata and the unencoded preview version comprises a first portion of the second content;
storing, by the system, the unencoded preview version of the second content;
playing, by the system, the unencoded preview version;
retrieving, by the system, a second portion of the second content, wherein the second portion is encoded according to a defined encoding;
purchasing, by the system, a key component to decode the encoding of the second portion of the second content; and decoding, by the system with the key component, the second portion of the second content facilitating generation of a full version of the first content available to be played.

34. The method of claim 33, further comprising presenting, by the system, the first content metadata associated with the first content.

35. The method of claim 33, further comprising sending, by the system, the first content to a remote device for download by authorized request.

36. The method of claim 33, further comprising deleting, by the system, the first content and the first content metadata after expiration of a predetermined period of time during which the first content has not been accessed.

37. The method of claim 33, wherein the system is a mobile handset.

38. The method of claim 33, further comprising transmitting the second content comprising the first portion of the second content and the second portion of the second content to a remote device, wherein the first portion comprising the unencoded preview version is made accessible via the remote device and the second portion is available for playing after the key component has been obtained.

39. The method of claim 33, further comprising transmitting the second content comprising the first portion of the second content and the second portion of the second content to a disparate device via a peer-to-peer arrangement.

40. A method, comprising:
receiving, by a mobile handset including a processor, data comprising music content from a content source via a wireless communications network;
playing, by the mobile handset, the music content;
forwarding, by the mobile handset, for review, at a remote content server, the music content;
requesting, by the mobile handset, the music content be identified by comparison with audio content at the remote content server;
receiving, by the mobile handset in response to the request for identification of the music content, a preview version of a second music track associated with the music content, wherein the preview version comprises a portion of a full version of the second music track;
playing, by the mobile handset, the preview version of the second music track;
tagging, by the mobile handset, the full version of the second music track for purchase;
downloading, by the mobile handset, the full version of the second music track for storage in the mobile handset; and
registering, by the mobile handset, a special keystroke in the mobile communications device to initiate a purchase of the downloaded full version of the second music track.

41. The method of claim 40, wherein the music content comprises a song.

42. The method of claim 40, further comprising downloading, by the mobile handset, an image associated with the second music track.

43. A non-transitory computer readable storage medium comprising computer executable instructions that, in response to execution, cause a system including a processor to perform operations, comprising:
receiving a radio signal from a radio service, the radio signal comprising music content;
playing the radio signal;
capturing a portion of the radio signal for review;
forwarding a request to a remote content server, the request comprising the portion of the radio signal and an indication for a match to be found between the portion of the radio signal and full length content at the remote content server;
receiving, in response to the match between the portion of the radio signal and full length content being found at the remote content server, a preview version of the full length content, wherein the preview version comprises a portion of the full length content;
presenting the preview version;
downloading the full length content, wherein the full length content being encoded;
submitting payment for a key facilitating decoding the full length content;
receiving the key; and
decoding the full length content to facilitate playing the full length content.

44. The non-transitory computer readable storage medium of claim 43, further comprising storing the portion of the radio signal.

45. The non-transitory computer readable storage medium of claim 43, further comprising presenting metadata associated with the radio signal, wherein the metadata comprises music track data associated with the music content comprising the radio signal.

46. The non-transitory computer readable storage medium of claim 43, wherein the forwarding to the remote content server includes wireless transmission.

47. The non-transitory computer readable storage medium of claim 43, further comprising predicting an action to be taken based on statistical analysis of use of the system.

48. The system of claim 43, wherein the presenting is initiated by a voice mail system device.

49. The system of claim 43, wherein the submitting the payment comprises activating a defined keystroke.

50. A method for, comprising:
receiving, by a system including a processor, first content from a remote component;
storing, by the system, the first content in a storage component;
forwarding, by the system, the first content to another remote component;
receiving, by the system, from the another remote component first content metadata wherein the first content metadata identifying the first content and being associated with second content, wherein the first content is at least a portion of the second content, and the second content comprises a first portion and a second portion, the first portion is unencoded preview content and the second portion is encoded content;
presenting, by the system, an option to download the second content;
storing, by the system, the second content locally;
playing, by the system, the first portion of the second content; and
forwarding, by the system in response to an indication to purchase of the second content, a key code facilitating decoding of the encoded content of the second portion, thereby facilitating the second content comprising the first portion of unencoded preview content and the unecoded second portion of content to be playable in entirety.

51. The method of claim 50, further comprising:
forwarding, by the system, a copy of the second content to a remote device, the copy of the second content comprising a first copy of the first unencoded preview content portion and a second copy of the second encoded content portion;

presenting, by the system, at the remote device the first copy of the first unencoded preview content;
forwarding, by the system, a request for a key to a remote access server, the key facilitating decoding the second copy of the second encoded content portion;
receiving, by the system, the key;
decoding, by the system using the key, the copy of the second encoded content portion; and
playing, by the system, the second encoded content portion.

* * * * *